US012731221B2

(12) United States Patent
Wada

(10) Patent No.: US 12,731,221 B2
(45) Date of Patent: Sep. 8, 2026

(54) IMAGING SUPPORT APPARATUS, MOVING OBJECT, IMAGING SUPPORT METHOD, AND PROGRAM TO CALCULATE A BLURRINESS AMOUNT OF AN OVERLAPPING REGION IMAGE BASED ON A REFERENCE IMAGE IN A DIVIDED IMAGE

(71) Applicant: FUJIFILM Corporation, Tokyo (JP)

(72) Inventor: Tetsu Wada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 150 days.

(21) Appl. No.: 18/900,844

(22) Filed: Sep. 29, 2024

(65) Prior Publication Data

US 2025/0022106 A1 Jan. 16, 2025

Related U.S. Application Data

(63) Continuation of application No. PCT/JP2023/012704, filed on Mar. 28, 2023.

(30) Foreign Application Priority Data

Apr. 5, 2022 (JP) ................................ 2022-062894

(51) Int. Cl.
*G06T 5/50* (2006.01)
*G06T 5/70* (2024.01)
(Continued)

(52) U.S. Cl.
CPC .................. *G06T 5/50* (2013.01); *G06T 5/70* (2024.01); *G06T 7/11* (2017.01); *G06V 10/141* (2022.01); *G06T 2207/20221* (2013.01)

(58) Field of Classification Search
CPC ..... G06T 5/50; G06T 5/70; G06T 7/11; G06T 2207/20221; G06V 10/141; H04N 23/60
See application file for complete search history.

(56) References Cited

U.S. PATENT DOCUMENTS

2014/0336928 A1* 11/2014 Scott .................. G01M 5/0033 701/468
2015/0196199 A1 7/2015 Toda
(Continued)

FOREIGN PATENT DOCUMENTS

JP 2012083233 4/2012
JP 2015032948 2/2015
(Continued)

OTHER PUBLICATIONS

"International Search Report (Form PCT/ISA/210) of PCT/JP2023/012704," mailed on Jun. 13, 2023, with English translation thereof, pp. 1-5.

(Continued)

*Primary Examiner* — Maurice L. Mcdowell, Jr.
(74) *Attorney, Agent, or Firm* — JCIPRNET

(57) ABSTRACT

An imaging support apparatus includes a processor, in which the processor is configured to, for each of a plurality of divided regions that are obtained by dividing an imaging target region and that have an overlapping region which is a region in which the divided regions partially overlap with each other, cause a light source to irradiate the overlapping region of the divided region with a reference light beam, acquire a divided image including a reference image indicating the reference light beam for each divided region by causing an imaging apparatus to image the divided region in a state where the overlapping region is irradiated with the reference light beam, and calculate a blurriness amount of an overlapping region image indicating the overlapping region for each divided region based on the reference image in the divided image.

14 Claims, 15 Drawing Sheets

(51) Int. Cl.
*G06T 7/11* (2017.01)
*G06V 10/141* (2022.01)

(56) References Cited

U.S. PATENT DOCUMENTS

| | | | | |
|---|---|---|---|---|
| 2017/0045354 | A1 | 2/2017 | Toda | |
| 2019/0094149 | A1* | 3/2019 | Troy | G05D 1/0094 |
| 2019/0113937 | A1* | 4/2019 | Sasaki | G05D 1/102 |
| 2020/0312028 | A1* | 10/2020 | Charvat | G05D 1/101 |
| 2023/0177968 | A1* | 6/2023 | Arksey | G06T 7/73<br>701/120 |

FOREIGN PATENT DOCUMENTS

| | | |
|---|---|---|
| JP | 2015132546 | 7/2015 |
| JP | 2016024516 | 2/2016 |
| JP | 2017034576 | 2/2017 |
| WO | 2016203844 | 12/2016 |

OTHER PUBLICATIONS

"Written Opinion of the International Searching Authority (Form PCT/ISA/237) of PCT/JP2023/012704," mailed on Jun. 13, 2023, with English translation thereof, pp. 1-6.

* cited by examiner

5
L
2A
2
3(3B)
3(3A)
OA
12
43
10
12
12
12
FLYING INSTRUCTION SIGNAL
MOVING INSTRUCTION SIGNAL
STANDSTILL INSTRUCTION SIGNAL
20
92
95A,95B
94
90A
(90)
22
24
1
30

FLYING OBJECT
10
TRANSMITTER
20
IMAGING APPARATUS
30
COMPUTER
32
PROCESSOR
46
STORAGE
48
RAM
50
52
IMAGE MEMORY
42
COMMUNICATION DEVICE
34
INPUT-OUTPUT I/F
44
IMAGE SENSOR DRIVER
38
IMAGE DATA
39
IMAGE SENSOR
36
IMAGING LENS
40
LASER LIGHT SOURCE
43
L

30
IMAGING APPARATUS
46
PROCESSOR
IMAGING SUPPORT PROCESSING
IMAGING CONTROL UNIT
BLURRINESS AMOUNT CALCULATION UNIT
BLURRINESS CORRECTION UNIT
FEATURE POINT INFORMATION GENERATION UNIT
COMPOSITE IMAGE GENERATION UNIT
OUTPUT UNIT
62
64
66
68
70
72
48
STORAGE
IMAGING SUPPORT PROCESSING PROGRAM
60
50
RAM

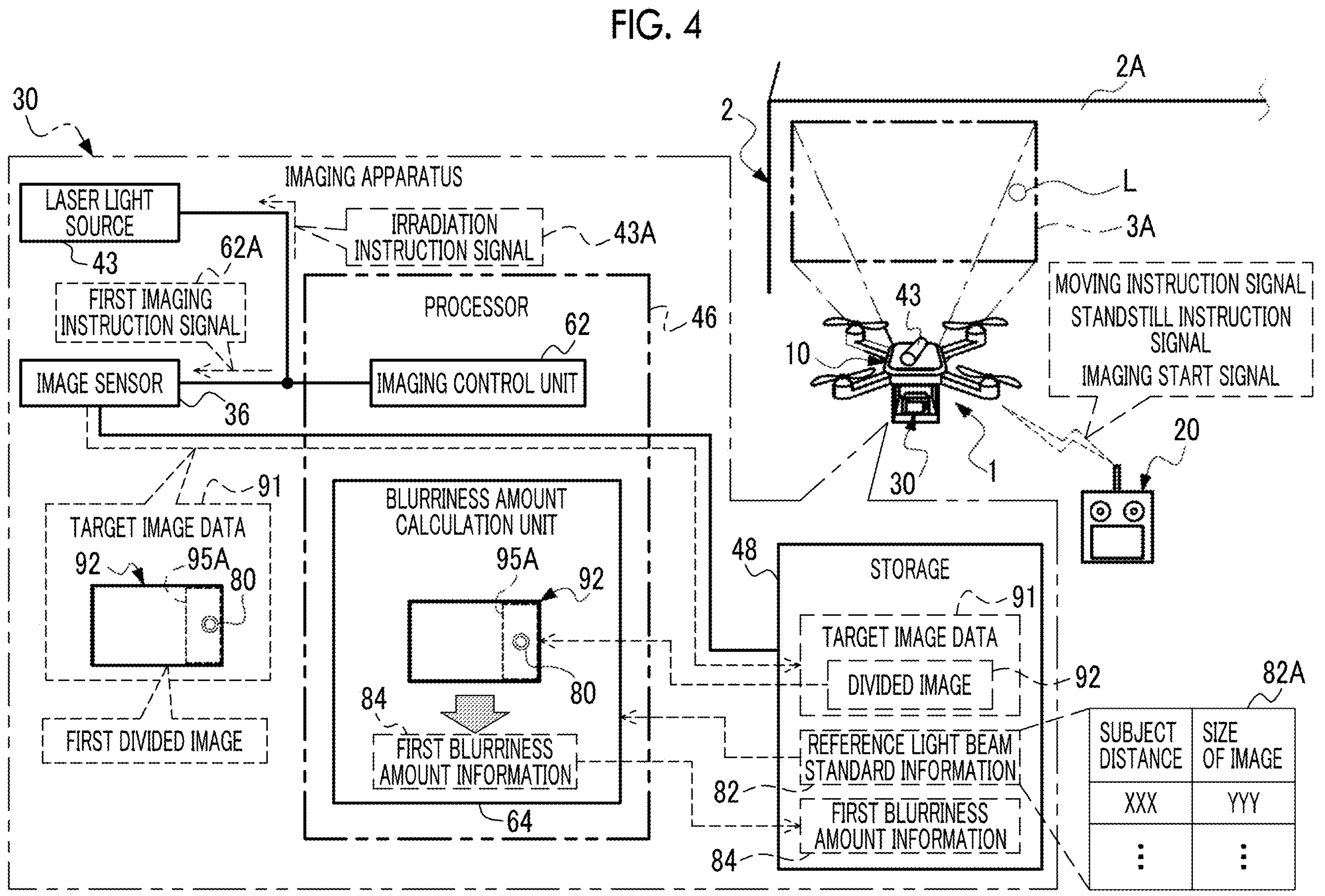

FIG. 4
30
IMAGING APPARATUS
LASER LIGHT SOURCE
43
IRRADIATION INSTRUCTION SIGNAL
43A
62A
FIRST IMAGING INSTRUCTION SIGNAL
PROCESSOR
46
62
IMAGE SENSOR
IMAGING CONTROL UNIT
36
91
TARGET IMAGE DATA
92
95A
80
FIRST DIVIDED IMAGE
BLURRINESS AMOUNT CALCULATION UNIT
95A
92
80
84
FIRST BLURRINESS AMOUNT INFORMATION
64
2
2A
L
3A
43
10
MOVING INSTRUCTION SIGNAL
STANDSTILL INSTRUCTION SIGNAL
IMAGING START SIGNAL
20
30
1
48
STORAGE
91
TARGET IMAGE DATA
DIVIDED IMAGE
92
REFERENCE LIGHT BEAM STANDARD INFORMATION
82
FIRST BLURRINESS AMOUNT INFORMATION
84
82A
SUBJECT DISTANCE
SIZE OF IMAGE
XXX
YYY
...
...

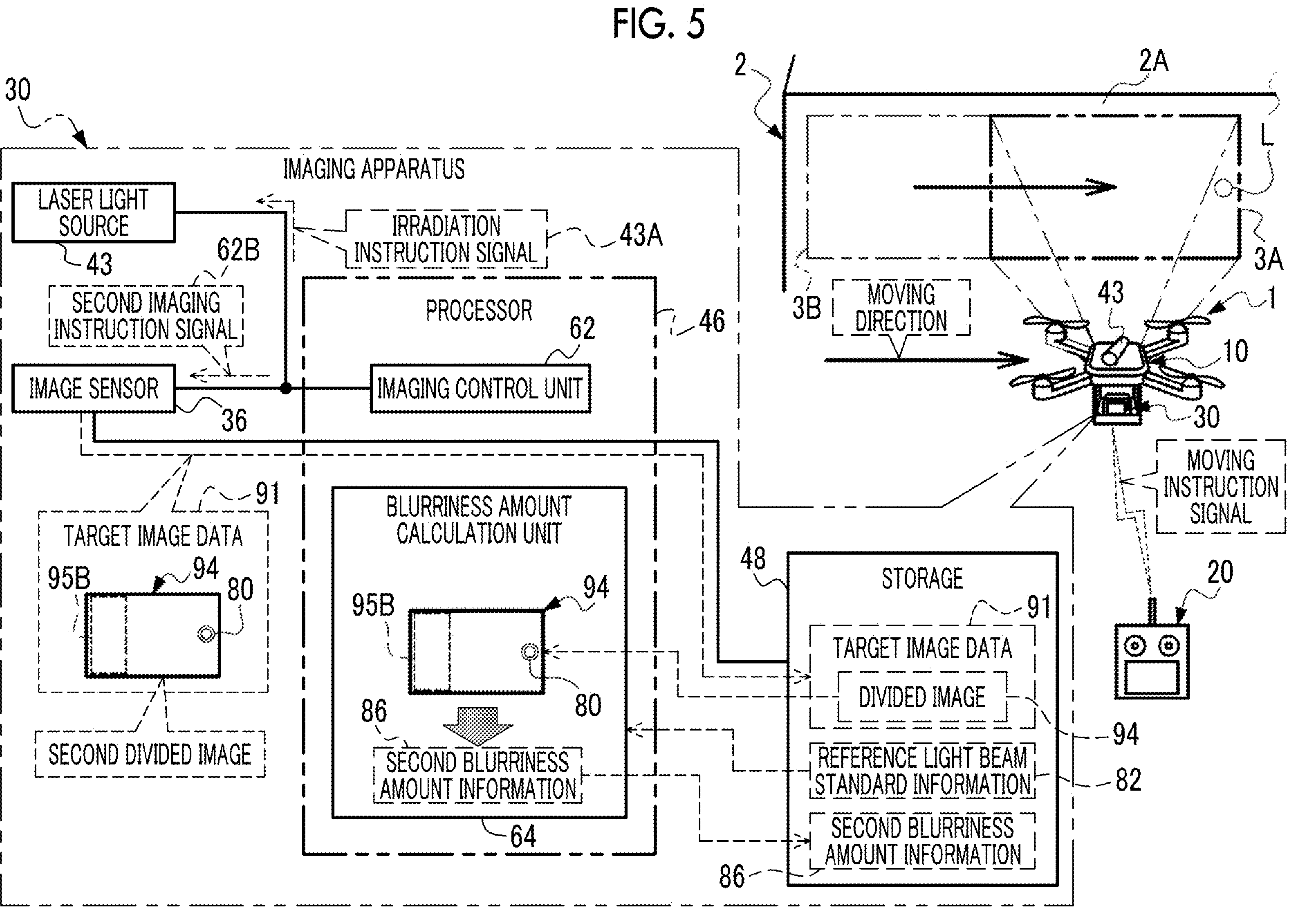
FIG. 5
30
IMAGING APPARATUS
LASER LIGHT SOURCE
43
IRRADIATION INSTRUCTION SIGNAL
43A
62B
SECOND IMAGING INSTRUCTION SIGNAL
PROCESSOR
62
46
IMAGE SENSOR
IMAGING CONTROL UNIT
36
91
TARGET IMAGE DATA
95B
94
80
SECOND DIVIDED IMAGE
BLURRINESS AMOUNT CALCULATION UNIT
95B
94
80
86
SECOND BLURRINESS AMOUNT INFORMATION
64
2
2A
L
3A
3B
MOVING DIRECTION
43
1
10
30
MOVING INSTRUCTION SIGNAL
20
48
STORAGE
91
TARGET IMAGE DATA
DIVIDED IMAGE
94
REFERENCE LIGHT BEAM STANDARD INFORMATION
82
SECOND BLURRINESS AMOUNT INFORMATION
86

Figure 7:
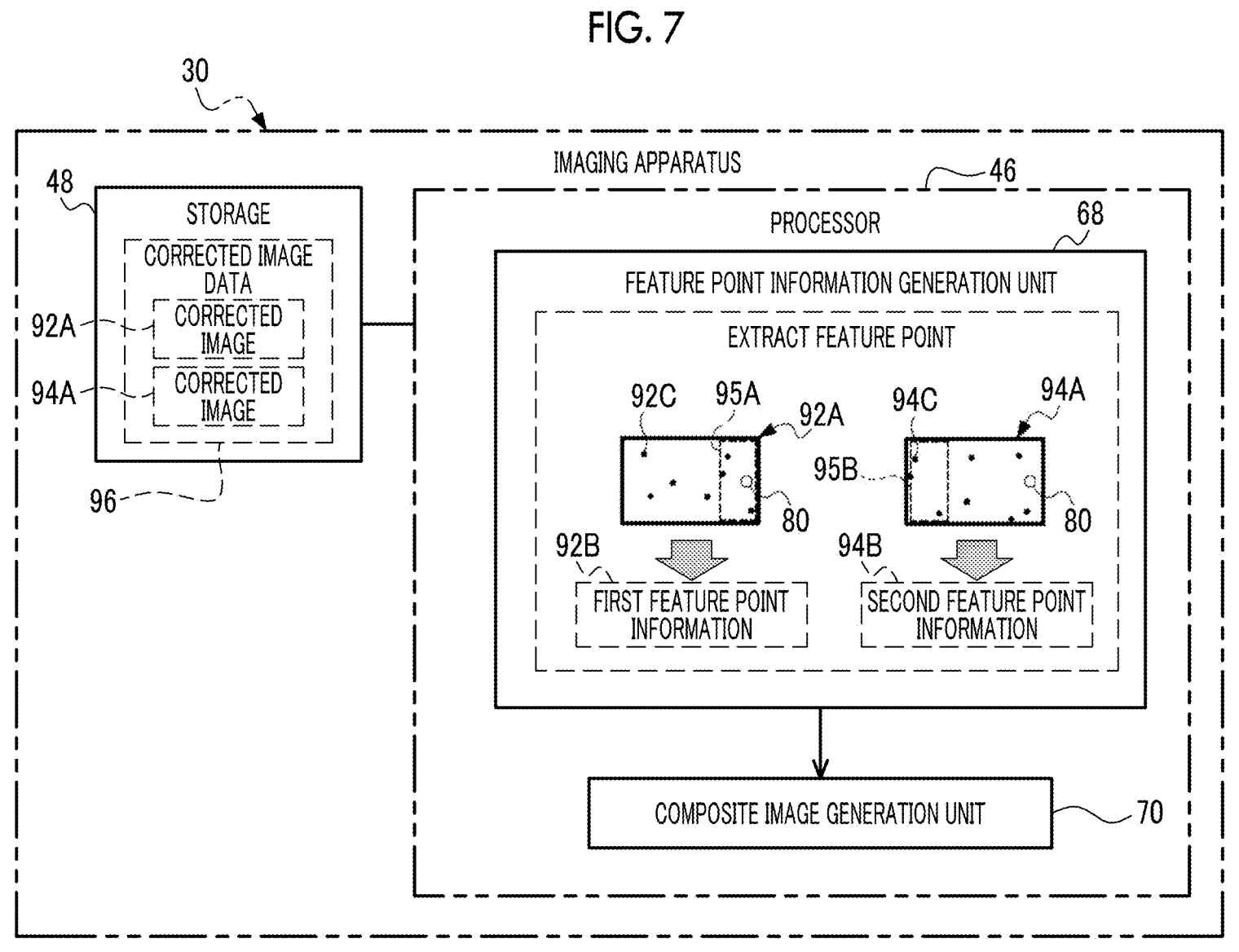

IMAGING APPARATUS

46

PROCESSOR

68

FEATURE POINT INFORMATION GENERATION UNIT

EXTRACT FEATURE POINT 92A 92C 95A 80

FIRST FEATURE POINT INFORMATION

92B 94A 94C 95B 80

SECOND FEATURE POINT INFORMATION

94B

70

COMPOSITE IMAGE GENERATION UNIT

48

STORAGE

CORRECTED IMAGE DATA

CORRECTED IMAGE

CORRECTED IMAGE 92A 94A 96

30
IMAGING APPARATUS
46
48
STORAGE
96
CORRECTED IMAGE DATA
94A
CORRECTED IMAGE
92A
CORRECTED IMAGE
PROCESSOR
70
COMPOSITE IMAGE GENERATION UNIT
IMAGE COMBINATION PROCESSING
92A
95A
80
95B
94A
80
92A
95B
90
94A
80
68
FEATURE POINT INFORMATION GENERATION UNIT
92B
FIRST FEATURE POINT INFORMATION
94B
SECOND FEATURE POINT INFORMATION
COMPOSITE IMAGE DATA
97
OUTPUT UNIT
72
95B
90
80
20
22
24

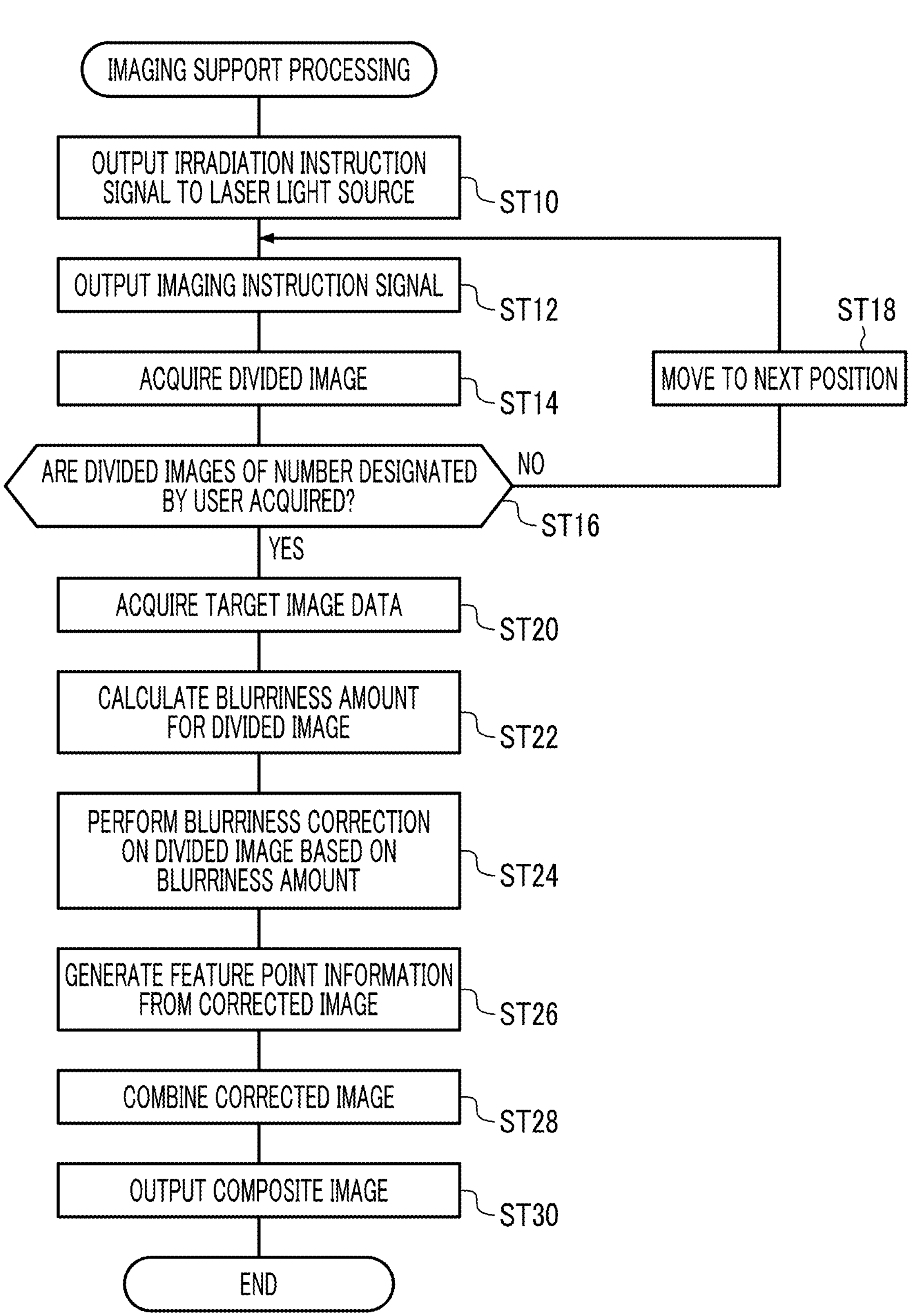
FIG. 9
IMAGING SUPPORT PROCESSING
OUTPUT IRRADIATION INSTRUCTION SIGNAL TO LASER LIGHT SOURCE
ST10
OUTPUT IMAGING INSTRUCTION SIGNAL
ST12
ACQUIRE DIVIDED IMAGE
ST14
ARE DIVIDED IMAGES OF NUMBER DESIGNATED BY USER ACQUIRED?
ST16
NO
MOVE TO NEXT POSITION
ST18
YES
ACQUIRE TARGET IMAGE DATA
ST20
CALCULATE BLURRINESS AMOUNT FOR DIVIDED IMAGE
ST22
PERFORM BLURRINESS CORRECTION ON DIVIDED IMAGE BASED ON BLURRINESS AMOUNT
ST24
GENERATE FEATURE POINT INFORMATION FROM CORRECTED IMAGE
ST26
COMBINE CORRECTED IMAGE
ST28
OUTPUT COMPOSITE IMAGE
ST30
END

FIG. 10

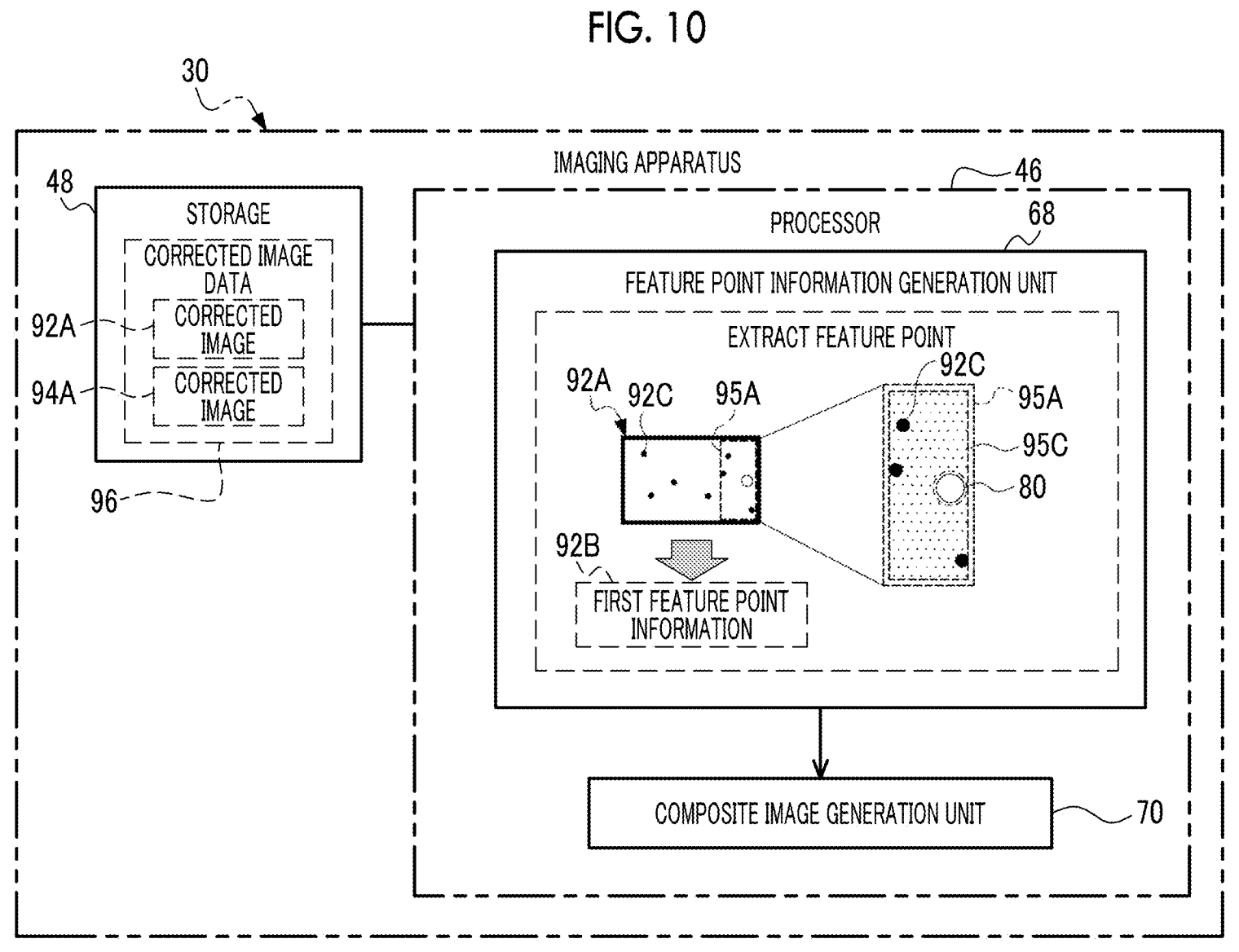

30
IMAGING APPARATUS
46
PROCESSOR
68
FEATURE POINT INFORMATION GENERATION UNIT
EXTRACT FEATURE POINT
95A
95C
80
92C
92A
92B
FIRST FEATURE POINT INFORMATION
70
COMPOSITE IMAGE GENERATION UNIT
48
STORAGE
CORRECTED IMAGE DATA
CORRECTED IMAGE
CORRECTED IMAGE
92A
94A
96

FIG. 11

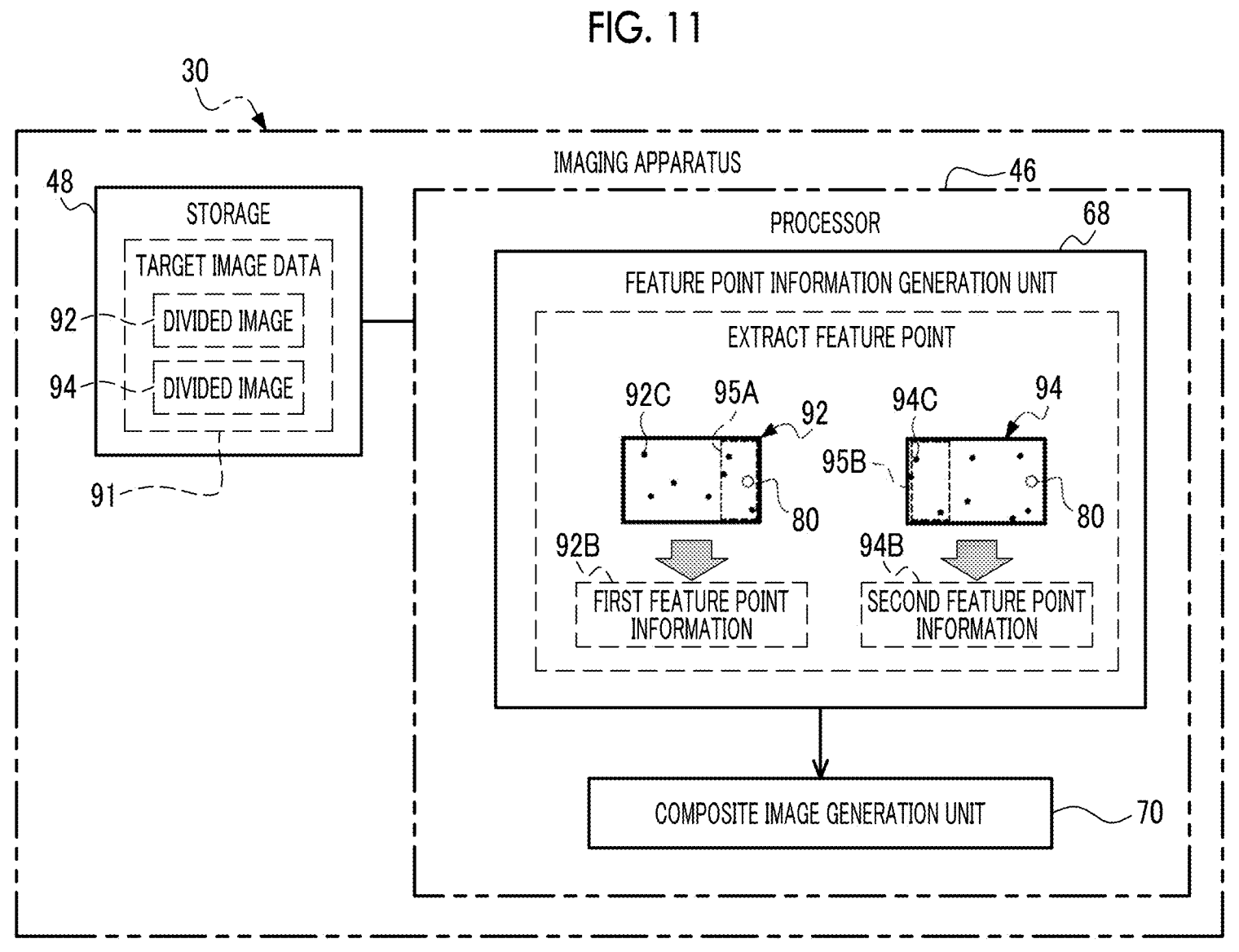

30
IMAGING APPARATUS
46
PROCESSOR
68
FEATURE POINT INFORMATION GENERATION UNIT
EXTRACT FEATURE POINT
92C
95A
92
80
FIRST FEATURE POINT INFORMATION
92B
94C
95B
94
80
SECOND FEATURE POINT INFORMATION
94B
COMPOSITE IMAGE GENERATION UNIT
70
STORAGE
TARGET IMAGE DATA
DIVIDED IMAGE
DIVIDED IMAGE
48
92
94
91

FIG. 12

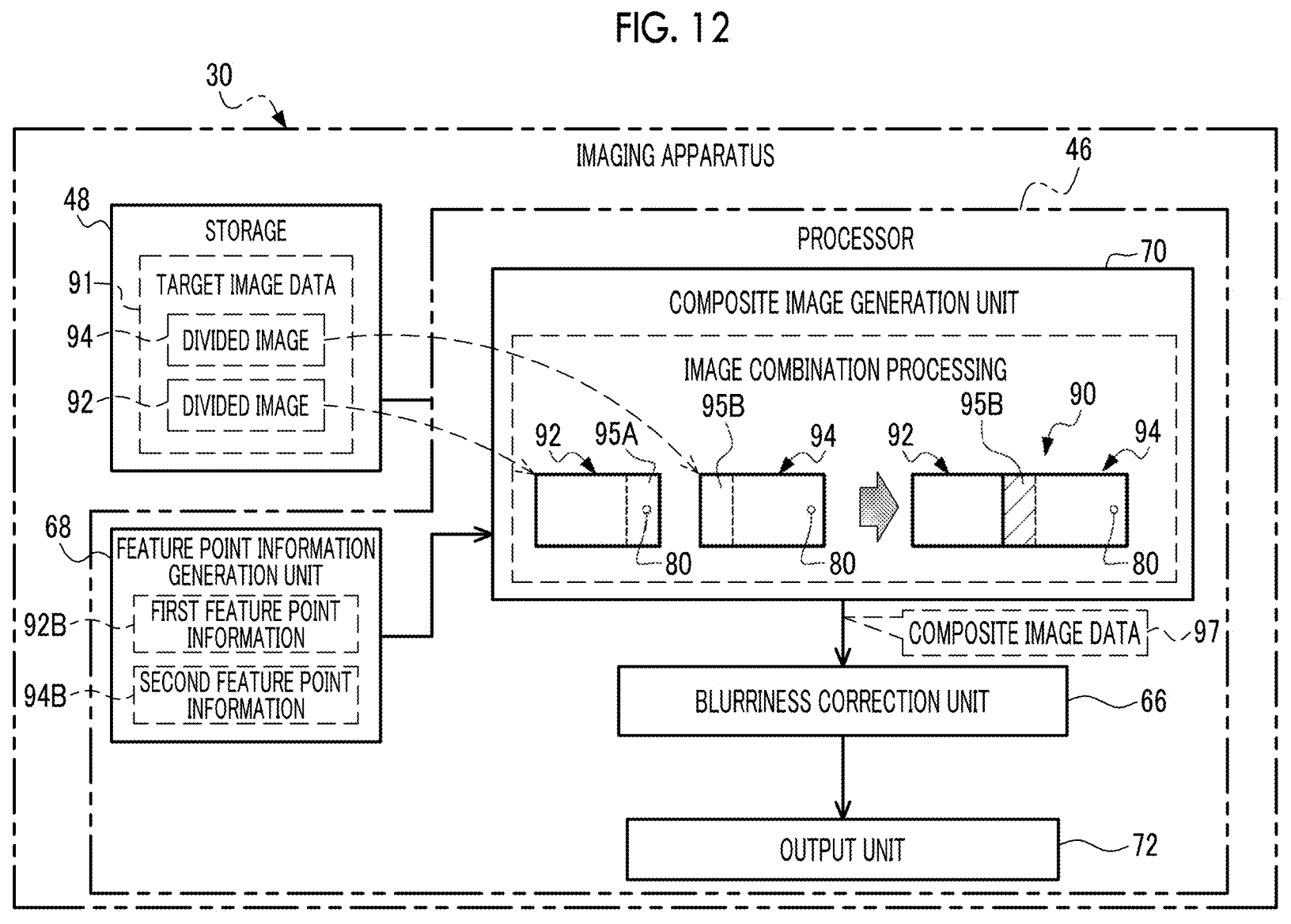

IMAGING APPARATUS

PROCESSOR

COMPOSITE IMAGE GENERATION UNIT

IMAGE COMBINATION PROCESSING

COMPOSITE IMAGE DATA

BLURRINESS CORRECTION UNIT

OUTPUT UNIT

STORAGE

TARGET IMAGE DATA

DIVIDED IMAGE

DIVIDED IMAGE

FEATURE POINT INFORMATION GENERATION UNIT

FIRST FEATURE POINT INFORMATION

SECOND FEATURE POINT INFORMATION 30 46 70 97 66 72 90 94 80 95B 92 95A 48 91 68 92B 94B

FIG. 13

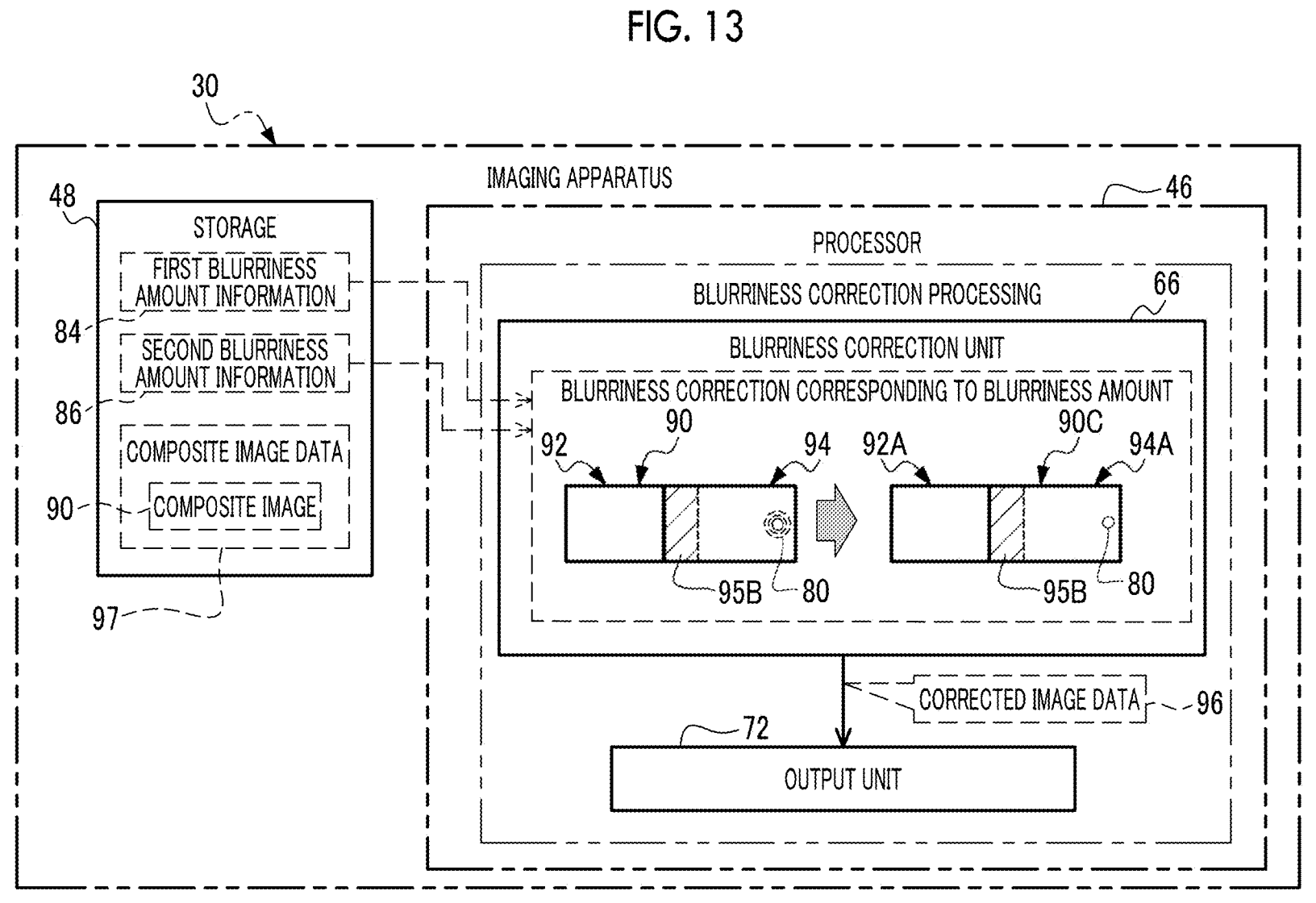

30
IMAGING APPARATUS
46
PROCESSOR
66
BLURRINESS CORRECTION PROCESSING
BLURRINESS CORRECTION UNIT
BLURRINESS CORRECTION CORRESPONDING TO BLURRINESS AMOUNT
92
90
94
80
95B
92A
90C
94A
80
95B
96
CORRECTED IMAGE DATA
72
OUTPUT UNIT
48
STORAGE
FIRST BLURRINESS AMOUNT INFORMATION
84
SECOND BLURRINESS AMOUNT INFORMATION
86
COMPOSITE IMAGE DATA
COMPOSITE IMAGE
90
97

FIG. 14

IMAGING SUPPORT APPARATUS, MOVING OBJECT, IMAGING SUPPORT METHOD, AND PROGRAM TO CALCULATE A BLURRINESS AMOUNT OF AN OVERLAPPING REGION IMAGE BASED ON A REFERENCE IMAGE IN A DIVIDED IMAGE

CROSS-REFERENCE TO RELATED APPLICATIONS

This application is a continuation application of International Application No. PCT/JP2023/012704, filed Mar. 28, 2023, the disclosure of which is incorporated herein by reference in its entirety. Further, this application claims priority from Japanese Patent Application No. 2022-062894, filed Apr. 5, 2022, the disclosure of which is incorporated herein by reference in its entirety.

BACKGROUND

1. Technical Field

The disclosed technology relates to an imaging support apparatus, a moving object, an imaging support method, and a program.

2. Related Art

According to JP2016-24516A, a mobile multi-image capturing apparatus includes imaging means consisting of at least one camera that images adjacent imaging regions overlapping with each other while moving continuously or irregularly at any interval, and one or plurality of marker assignment means for assigning a marker to a subject in a common imaging region overlapping with each imaging region in a fixed manner for a predetermined time. According to the mobile multi-image capturing apparatus, the imaging means and the marker assignment means include means for deriving a relationship between an imaging position and a marker assignment position during movement of the imaging means, and means for, in imaging that precedes and succeeds in accordance with forward movement of the imaging unit, controlling timings of marker assignment and imaging such that at a preceding imaging position, at least one marker fixed to the subject is assigned to be included in an imaging range and in the succeeding imaging, imaging is performed in a specific positional relationship with a marker assignment position to include the marker. The mobile multi-image capturing apparatus comprises correction parameter calculation means for calculating a correction parameter for connecting the imaging regions to each other from a marker-assigned image group, and image combination means for generating a composite image obtained by combining a captured image group based on the correction parameter.

In JP2017-34576A, an image capturing system includes an imaging apparatus and an image processing apparatus. The imaging apparatus includes a camera device including at least one camera that images an imaging region of a part of a subject, and a marker assignment unit consisting of at least one marker laser that assigns markers by irradiating at least four locations in the imaging region with a laser beam, and a measurement unit that measures a physical parameter for obtaining three-dimensional coordinates of each assigned marker including a distance from a standard position of the marker laser to the assigned marker or a pan angle or a tilt angle between irradiation directions of the marker laser adjacent to each other. In a case where a captured image in which the markers are assigned to at least four marker assignment locations of the imaging region at the same time or in order by the marker assignment unit and a captured image to which the markers are not assigned at the same time or in order are captured by the camera, the imaging apparatus executes measurement of the physical parameter each time the marker is assigned to the marker assignment location. According to the image capturing system, the image processing apparatus includes an acquisition unit that acquires a captured image group and a measured value of the physical parameter from the imaging apparatus, a captured image marker coordinate extraction unit that extracts marker image coordinates from the captured image based on a set of pixels constituting marker images of the captured image to which the markers are assigned, a normalized image marker coordinate calculation unit that derives three-dimensional coordinates of the markers corresponding to the marker images from the measured value of the physical parameter, transforms the three-dimensional coordinates into coordinates of a plane of a surface of the subject configured with the markers, and further calculates marker coordinates of a normalized image in a case where the markers are seen as perspective images from a specific viewpoint position normal to the plane of the surface of the subject, a normalization correction value calculation unit that calculates a normalization correction value for performing projective transformation of the captured image into the normalized image from the marker coordinates of the normalized image corresponding to marker image coordinates of at least four captured images, and a normalized image transformation unit that generates a normalized image of an imaging region in which a marker image is not captured, by applying the normalization correction value to the image in which the markers are not assigned to the marker assignment locations.

According to JP2015-32948A, an image processing apparatus receives a plurality of pieces of image data and obtains composite image data by performing combination processing on the plurality of pieces of image data. Each of the plurality of pieces of image data has information indicating an intensity distribution of light and an incidence direction of light. According to the image processing apparatus, the image processing apparatus includes refocus processing means for generating a plurality of pieces of refocused image data by performing refocus processing on the plurality of pieces of image data in accordance with a first refocus coefficient and generating a plurality of pieces of combination image data by performing the refocus processing on the plurality of pieces of image data in accordance with a second refocus coefficient different from the first refocus coefficient, detection means for obtaining overlapping location information by receiving the plurality of pieces of refocused image data and detecting an overlapping location in the refocused image data, and combination means for obtaining the composite image data by performing the combination processing on the plurality of pieces of combination image data in accordance with the overlapping location information.

SUMMARY

One embodiment according to the disclosed technology provides an imaging support apparatus, a moving object, an imaging support method, and a program that can accurately calculate a blurriness amount of an overlapping region image included in divided images in a case where a composite image is generated from a plurality of divided images.

According to a first aspect of the disclosed technology, there is provided an imaging support apparatus comprising a processor, in which the processor is configured to, for each of a plurality of divided regions that are obtained by dividing an imaging target region and that have an overlapping region which is a region in which the divided regions partially overlap with each other, cause a light source to irradiate the overlapping region of the divided region with a reference light beam, acquire a divided image including a reference image indicating the reference light beam for each divided region by causing an imaging apparatus to image the divided region in a state where the overlapping region is irradiated with the reference light beam, and calculate a blurriness amount of an overlapping region image indicating the overlapping region for each divided region based on the reference image in the divided image.

According to a second aspect of the disclosed technology, in the imaging support apparatus according to the first aspect, the processor is configured to individually perform blurriness correction on each of a plurality of the divided images in accordance with the blurriness amount.

According to a third aspect of the disclosed technology, in the imaging support apparatus according to the second aspect, the processor is configured to generate a composite image by combining the plurality of divided images subjected to the blurriness correction.

According to a fourth aspect of the disclosed technology, in the imaging support apparatus according to the third aspect, the processor is configured to combine the plurality of divided images based on a feature point included in the overlapping region image after the blurriness correction.

According to a fifth aspect of the disclosed technology, in the imaging support apparatus according to the fourth aspect, the feature point is included in a region other than the reference image in the overlapping region image.

According to a sixth aspect of the disclosed technology, in the imaging support apparatus according to the first aspect, the processor is configured to generate a composite image by combining a plurality of the divided images obtained for the plurality of divided regions, and perform blurriness correction on the composite image using the blurriness amount obtained for each divided region.

According to a seventh aspect of the disclosed technology, in the imaging support apparatus according to any one of the third to sixth aspects, in a case where the plurality of divided images including a corresponding overlapping region image are counted as a set, the reference image is included in the overlapping region image in one of the set of divided images, and the composite image includes the overlapping region image included in the other of the set of divided images.

According to an eighth aspect of the disclosed technology, in the imaging support apparatus according to any one of the first to seventh aspects, the reference light beam is a directional light beam, and the reference image is an image of the directional light beam.

According to a ninth aspect of the disclosed technology, in the imaging support apparatus according to any one of the first to eighth aspects, the blurriness amount is calculated based on a size of the reference image.

According to a tenth aspect of the disclosed technology, in the imaging support apparatus according to any one of the first to ninth aspects, a position determined in advance in the overlapping region image is irradiated with the reference light beam.

According to an eleventh aspect of the disclosed technology, in the imaging support apparatus according to any one of the first to tenth aspects, each of the plurality of divided regions is determined in advance by an angle of view of the imaging apparatus.

According to a twelfth aspect of the disclosed technology, there is provided a moving object comprising the imaging support apparatus according to any one of the first to eleventh aspects.

According to a thirteenth aspect of the disclosed technology, there is provided an imaging support method comprising causing, for each of a plurality of divided regions that are obtained by dividing an imaging target region and that have an overlapping region which is a region in which the divided regions partially overlap with each other, a light source to irradiate the overlapping region of the divided region with a reference light beam, acquiring a divided image including a reference image indicating the reference light beam for each divided region by causing an imaging apparatus to image the divided region in a state where the overlapping region is irradiated with the reference light beam, and calculating a blurriness amount of an overlapping region image indicating the overlapping region for each divided region based on the reference image in the divided image.

According to a fourteenth aspect of the disclosed technology, there is provided a program causing a computer to execute a process comprising causing, for each of a plurality of divided regions that are obtained by dividing an imaging target region and that have an overlapping region which is a region in which the divided regions partially overlap with each other, a light source to irradiate the overlapping region of the divided region with a reference light beam, acquiring a divided image including a reference image indicating the reference light beam for each divided region by causing an imaging apparatus to image the divided region in a state where the overlapping region is irradiated with the reference light beam, and calculating a blurriness amount of an overlapping region image indicating the overlapping region for each divided region based on the reference image in the divided image.

BRIEF DESCRIPTION OF THE DRAWINGS

Exemplary embodiments according to the technique of the present disclosure will be described in detail based on the following figures, wherein:

FIG. 4 is a descriptive diagram for describing an example of imaging processing and blurriness amount calculation processing in a processor;

FIG. 5 is a descriptive diagram for describing an example of the imaging processing and the blurriness amount calculation processing in the processor;

FIG. 7 is a descriptive diagram for describing an example of feature point extraction processing in the processor;

FIG. 9 is a flowchart for describing an example of a flow of imaging support processing;

FIG. 10 is a descriptive diagram for describing an example of the feature point extraction processing according to a first modification example;

FIG. 11 is a descriptive diagram for describing an example of the feature point extraction processing in the processor;

FIG. 12 is a descriptive diagram for describing an example of the image combination processing in the processor;

FIG. 13 is a descriptive diagram for describing an example of the blurriness correction processing in the processor;

FIG. 14 is a descriptive diagram for describing an example of the image combination processing according to a second modification example.

DETAILED DESCRIPTION

Hereinafter, an example of embodiments of an imaging support apparatus, a moving object, an imaging support method, and a program according to the disclosed technology will be described with reference to the accompanying drawings.

First, terms used in the following description will be described.

I/F refers to the abbreviation for "Interface". RAM refers to the abbreviation for "Random Access Memory". EEPROM refers to the abbreviation for "Electrically Erasable Programmable Read-Only Memory". CPU refers to the abbreviation for "Central Processing Unit". HDD refers to the abbreviation for "Hard Disk Drive". SSD refers to the abbreviation for "Solid State Drive". DRAM refers to the abbreviation for "Dynamic Random Access Memory". SRAM refers to the abbreviation for "Static Random Access Memory". CMOS refers to the abbreviation for "Complementary Metal Oxide Semiconductor". GPU refers to the abbreviation for "Graphics Processing Unit". TPU refers to the abbreviation for "Tensor Processing Unit". USB refers to the abbreviation for "Universal Serial Bus". ASIC refers to the abbreviation for "Application Specific Integrated Circuit". FPGA refers to the abbreviation for "Field-Programmable Gate Array". PLD refers to the abbreviation for "Programmable Logic Device". SoC refers to the abbreviation for "System-on-a-Chip". IC refers to the abbreviation for "Integrated Circuit". AI refers to the abbreviation for "Artificial Intelligence". SLD refers to the abbreviation for "Super Luminescent Diode". LED refers to the abbreviation for "Light Emitting Diode".

In description of the present specification, the term "perpendicular" refers to not only being completely perpendicular but also being perpendicular in a sense of including an error that is generally allowed in the technical field of the disclosed technology and that does not contradict the gist of the disclosed technology. In description of the present specification, the term "horizontal direction" refers to not only a complete horizontal direction but also a horizontal direction in a sense of including an error that is generally allowed in the technical field of the disclosed technology and that does not contradict the gist of the disclosed technology. In description of the present specification, the term "vertical direction" refers to not only a complete vertical direction but also a vertical direction in a sense of including an error that is generally allowed in the technical field of the disclosed technology and that does not contradict the gist of the disclosed technology.

First Embodiment

Figure 1:
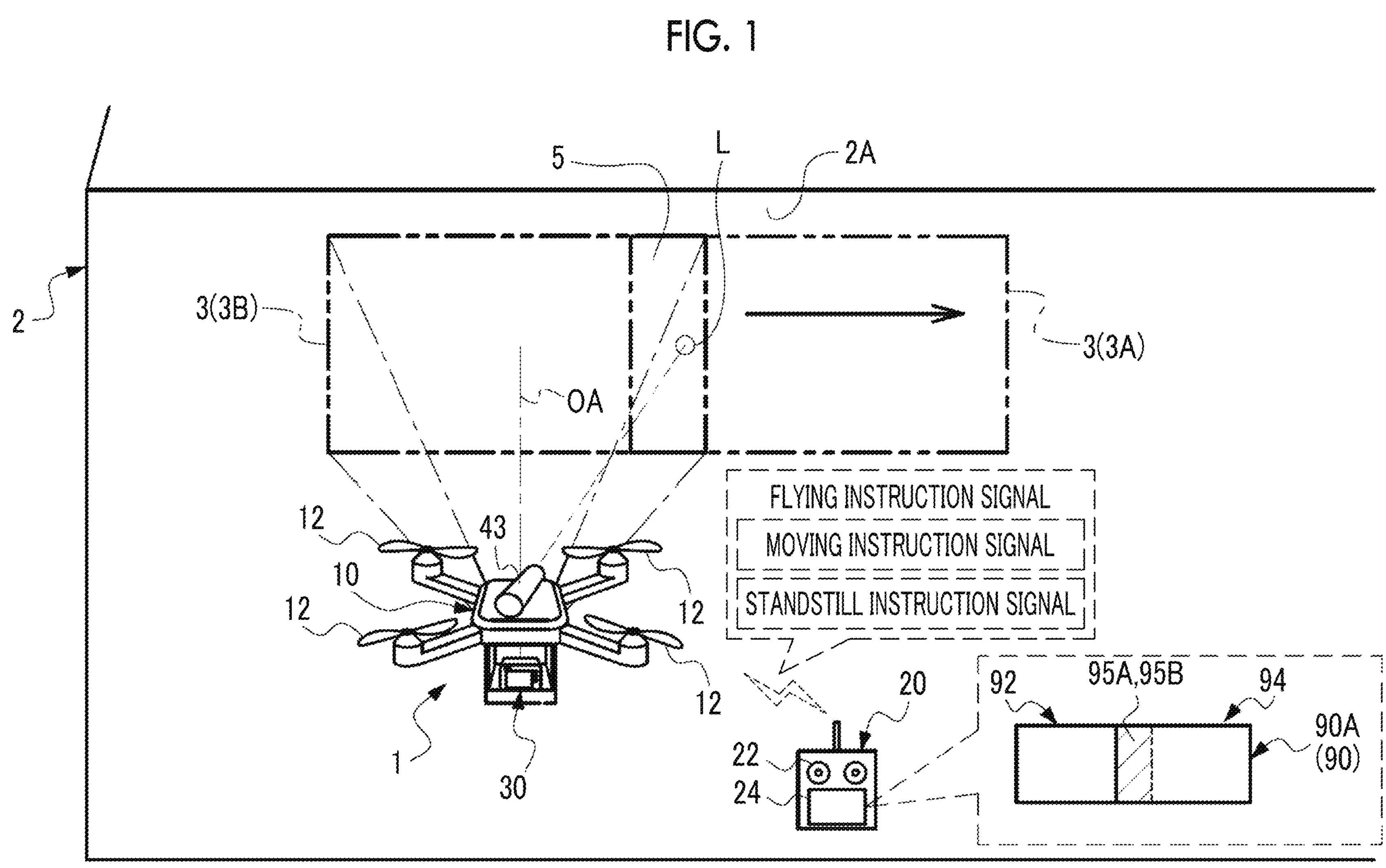
FIG. 1 is a perspective view illustrating an example of a flying imaging apparatus.

For example, as illustrated in FIG. 1, a flying imaging apparatus 1 comprises a flying function and an imaging function and images a wall surface 2A of an imaging target 2 while flying. In description of the present specification, a concept of "flying" includes not only a meaning indicating that the flying imaging apparatus 1 moves in the air but also a meaning indicating that the flying imaging apparatus 1 is at a standstill in the air. The flying imaging apparatus 1 is an example of the "moving object" according to the disclosed technology, and the imaging target 2 is an example of an "imaging target region" according to the disclosed technology.

For example, the wall surface 2A is a plane. A plane refers to a two-dimensional surface (that is, a surface along a two-dimensional direction). In description of the present specification, a concept of "plane" does not include a meaning of a mirror surface. In the present embodiment, for example, the wall surface 2A is a plane defined in a horizontal direction and a vertical direction (that is, a surface extending in the horizontal direction and the vertical direction). For example, the imaging target 2 having the wall surface 2A is a pier provided in a bridge. For example, the pier is made of reinforced concrete. While a pier is illustrated as an example of the imaging target 2, the imaging target 2 may be an object other than a pier (for example, a tunnel or a dam).

The flying function of the flying imaging apparatus 1 (hereinafter, simply referred to as the "flying function") is a function of causing the flying imaging apparatus 1 to fly based on a flying instruction signal. The flying instruction signal refers to a signal for instructing the flying imaging apparatus 1 to fly. For example, the flying instruction signal is transmitted from a transmitter 20 for operating the flying imaging apparatus 1. The transmitter 20 is operated by a user (not illustrated). The transmitter 20 comprises an operation unit 22 for operating the flying imaging apparatus 1, and a display device 24 for displaying an image obtained by imaging performed by the flying imaging apparatus 1. For example, the display device 24 is a liquid crystal display.

The flying instruction signal is specifically classified into a plurality of instruction signals including a moving instruction signal for providing an instruction to move the flying imaging apparatus 1 and an instruction for a moving direction, and a standstill instruction signal for providing an instruction to bring the flying imaging apparatus 1 to a standstill. While an example of transmitting the flying instruction signal the transmitter 20 is illustrated, the flying instruction signal may be transmitted from a base station (not illustrated) or the like that sets a flying route for the flying imaging apparatus 1. The imaging function of the flying imaging apparatus 1 (hereinafter, simply referred to as the "imaging function") is a function of causing the flying imaging apparatus 1 to image a subject (for example, the wall surface 2A of the imaging target 2).

The flying imaging apparatus 1 comprises a flying object 10 and an imaging apparatus 30. For example, the flying object 10 is an unmanned aerial vehicle such as a drone. The flying function is implemented by the flying object 10. The flying object 10 includes a plurality of propellers 12, and flies by rotating the plurality of propellers 12. Flying of the flying object 10 is synonymous with flying of the flying imaging apparatus 1.

For example, the imaging apparatus 30 is a digital camera or a video camera. The imaging function is implemented by the imaging apparatus 30. The imaging apparatus 30 is mounted on the flying object 10. Specifically, the imaging apparatus 30 is provided in a lower portion of the flying object 10. While an example of providing the imaging apparatus 30 in the lower portion of the flying object 10 is illustrated, the imaging apparatus 30 may be provided in an upper portion, a front portion, or the like of the flying object 10.

The flying imaging apparatus 1 comprises a laser light source 43. The laser light source 43 is mounted on the flying object 10. Specifically, the laser light source 43 is provided in the upper portion of the flying object 10. While an example of providing the laser light source 43 in the upper portion of the flying object 10 is illustrated, the laser light source 43 may be provided in the lower portion, the front portion, or the like of the flying object 10 or may be integrated with the imaging apparatus 30.

The laser light source 43 irradiates the imaging target 2 with a laser light beam L. A position determined in advance in a divided region 3 is irradiated with the laser light beam L as a reference light beam. The reference light beam is a light beam with which the divided region 3 is irradiated as a reference target for calculating a blurriness amount, described below. The laser light source 43 operates under control of a computer 32. For example, the laser light beam L is a light beam having a wavelength in a visible light range. However, this is merely an example. The laser light beam L may be an infrared light beam. The laser light beam L is an example of a "reference light beam" and a "directional light beam" according to the disclosed technology. The laser light source 43 is an example of a "light source" according to the disclosed technology.

An overlapping region 5 of an imaging target divided region 3A is irradiated with the laser light beam L. A position irradiated with the laser light beam L in the overlapping region 5 is determined in advance. For example, the position irradiated with the laser light beam L is a center part of the overlapping region 5.

The imaging apparatus 30 images the divided region 3 of the wall surface 2A in order. The divided region 3 is a region obtained by dividing the wall surface 2A. For example, the divided region 3 is determined by an angle of view of the imaging apparatus 30. A plurality of divided regions 3 are an example of a "plurality of divided regions" according to the disclosed technology. In the example illustrated in FIG. 1, a quadrangular region is illustrated as an example of the divided region 3. A plurality of divided images 92 and 94 are obtained by imaging the plurality of divided regions 3 in order via the imaging apparatus 30. A composite image 90 is generated by combining the plurality of divided images 92 and 94. The plurality of divided images 92 and 94 are combined such that the adjacent divided images 92 and 94 partially overlap with each other. For example, the composite image 90 is used for inspecting or surveying the wall surface 2A of the imaging target 2. In the example illustrated in FIG. 1, the composite image 90 is a two-dimensional image 90A. The composite image 90 is an example of a "composite image" according to the disclosed technology.

In the example illustrated in FIG. 1, an aspect of imaging each divided region 3 via the imaging apparatus 30 in a state where an optical axis OA of the imaging apparatus 30 is perpendicular to the wall surface 2A is illustrated. The plurality of divided regions 3 are imaged such that the adjacent divided regions 3 partially overlap with each other. A purpose of imaging the plurality of divided regions 3 such that the adjacent divided regions 3 partially overlap with each other is to generate the composite image 90 corresponding to the adjacent divided regions 3 based on a feature point (for example, a stain and/or roughness present on the wall surface 2A) included in an overlapping part between the adjacent divided regions 3.

Hereinafter, partial overlapping between the adjacent divided regions 3 will be referred to as overlapping, and a region in which the adjacent divided regions 3 overlap with each other will be referred to as the overlapping region 5. The overlapping region 5 is an example of an "overlapping region" according to the disclosed technology. A ratio of an area of the overlapping region 5 to an area of the entirety of each divided region 3 will be referred to as an overlapping ratio. The overlapping ratio is set to a predetermined overlapping ratio. For example, the predetermined overlapping ratio is set to a ratio (for example, 30%) at which a sufficient quantity of feature points for generating the composite image 90 are estimated to be obtained. The composite image 90 is generated by combining the divided images 92 and 94 in overlapping region images 95A and 95B that are images indicating the overlapping region 5. The overlapping region images 95A and 95B are examples of an "overlapping region image" according to the disclosed technology.

In the example illustrated in FIG. 1, the plurality of divided regions 3 include the divided region 3 that is already imaged (that is, the divided region 3 imaged by the flying imaging apparatus 1) and the divided region 3 that is not imaged yet (that is, the divided region 3 to be imaged by the flying imaging apparatus 1). Hereinafter, in a case where the plurality of divided regions 3 are described with distinction, the divided region 3 that is not imaged yet among the plurality of divided regions 3 will be referred to as the "imaging target divided region 3A", and the divided region 3 that is already imaged among the plurality of divided regions 3 will be referred to as an "imaged divided region 3B".

For example, the flying imaging apparatus 1 images the plurality of divided regions 3 while moving in the horizontal direction. The flying imaging apparatus 1 images each of the plurality of divided regions 3 in an order in which a part of the imaging target divided region 3A and a part of the imaged divided region 3B imaged immediately before (for example, one frame before) the imaging target divided region 3A overlap with each other. While, for example, as illustrated in FIG. 1, the following description will be based on an assumption of imaging the plurality of divided regions 3 by moving the flying imaging apparatus 1 in the horizontal direction, this is merely an example. For example, the flying imaging apparatus 1 may image the plurality of divided regions 3 while moving in a zigzag manner by alternating movement in the horizontal direction and movement in the vertical direction.

Figure 2:
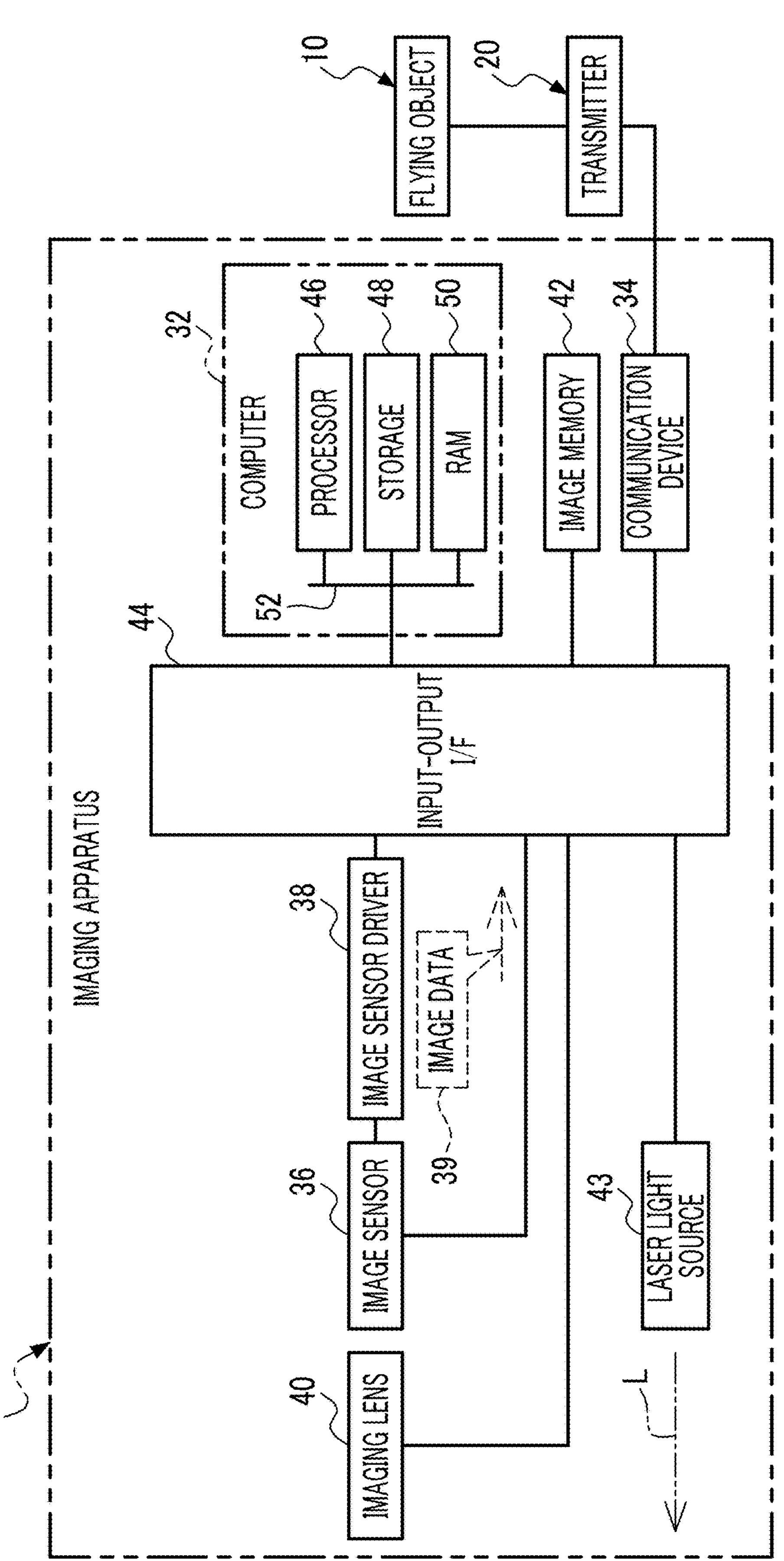
FIG. 2 is a block diagram illustrating an example of a hardware configuration of an imaging apparatus.

For example, as illustrated in FIG. 2, the imaging apparatus 30 comprises the computer 32, a communication device 34, an image sensor 36, an image sensor driver 38, an imaging lens 40, an image memory 42, the laser light source 43, and an input-output I/F 44. The imaging apparatus 30 is an example of an "imaging apparatus" according to the disclosed technology.

The computer 32 comprises a processor 46, a storage 48, and a RAM 50. The processor 46, the storage 48, and the RAM 50 are connected to each other through a bus 52, and the bus 52 is connected to the input-output I/F 44. The communication device 34, the image sensor driver 38, the imaging lens 40, the image memory 42, and the laser light source 43 are also connected to the input-output I/F 44. The computer 32 is an example of a "computer" and the "imaging support apparatus" according to the disclosed technology. The processor 46 is an example of a "processor" according to the disclosed technology.

For example, the processor 46 includes a CPU and controls the entire imaging apparatus 30. The storage 48 is a non-volatile storage device that stores various programs and various parameters and the like. Examples of the storage 48 include an HDD and/or a flash memory (for example, an EEPROM and/or an SSD).

The RAM 50 is a memory temporarily storing information and is used as a work memory by the processor 46. Examples of the RAM 50 include a DRAM and/or an SRAM.

For example, the communication device 34 is communicably connected to the transmitter 20. The communication device 34 is wirelessly communicably connected to the transmitter 20 using a predetermined wireless communication standard. Examples of the predetermined wireless communication standard include Wi-Fi (registered trademark). The communication device 34 exchanges information with the transmitter 20. For example, the communication device 34 transmits information corresponding to a request from the processor 46 to the transmitter 20. The communication device 34 also receives information transmitted from the transmitter 20 and outputs the received information to the processor 46 through the bus 52. While an example of communicably connecting the communication device 34 to the transmitter 20 is illustrated, the communication device 34 may be communicably connected to the transmitter 20 and/or the flying object 10.

The image sensor 36 is connected to the image sensor driver 38. The image sensor driver 38 controls the image sensor 36 in accordance with an instruction from the processor 46. For example, the image sensor 36 is a CMOS color image sensor. While a CMOS color image sensor is illustrated as the image sensor 36, the disclosed technology is not limited to this, and other image sensors may be used. The image sensor 36 images the subject (for example, the wall surface 2A of the imaging target 2) and outputs image data 39 obtained by imaging under control of the image sensor driver 38.

The imaging lens 40 is disposed on a side closer to the subject than the image sensor 36. The imaging lens 40 receives subject light that is reflected light from the subject, and forms an image of the received subject light on an imaging surface of the image sensor 36. The imaging lens 40 includes a plurality of optical elements (not illustrated) such as a focus lens, a zoom lens, and a stop. The imaging lens 40 is connected to the computer 32 through the input-output I/F 44. Specifically, the plurality of optical elements included in the imaging lens 40 are connected to the input-output I/F 44 through a drive mechanism (not illustrated) including a motive power source. The plurality of optical elements included in the imaging lens 40 operate under control of the computer 32. In the imaging apparatus 30, optical zooming and adjustment and the like of a shutter speed are implemented by operating the plurality of optical elements included in the imaging lens 40.

The image data 39 generated by the image sensor 36 is temporarily stored in the image memory 42. The processor 46 acquires the image data 39 from the image memory 42 and executes various types of processing using the acquired image data 39.

As described above, in a case where the composite image 90 is generated, the composite image 90 is generated based on the feature point included in the overlapping part (that is, the overlapping region 5) between the adjacent divided regions 3. However, an imaging condition (for example, a subject distance) may change for each of the divided images 92 and 94 obtained by imaging the divided regions 3. In such a case, blurriness may occur in the divided images 92 and 94. In a case where blurriness of a level at which it is difficult to extract the feature point has occurred in the divided images 92 and 94, it is necessary to combine the divided images 92 and 94 after suppressing the blurriness. However, this is based on a premise that blurriness amounts of the divided images 92 and 94 need to be accurately obtained.

Figure 3:
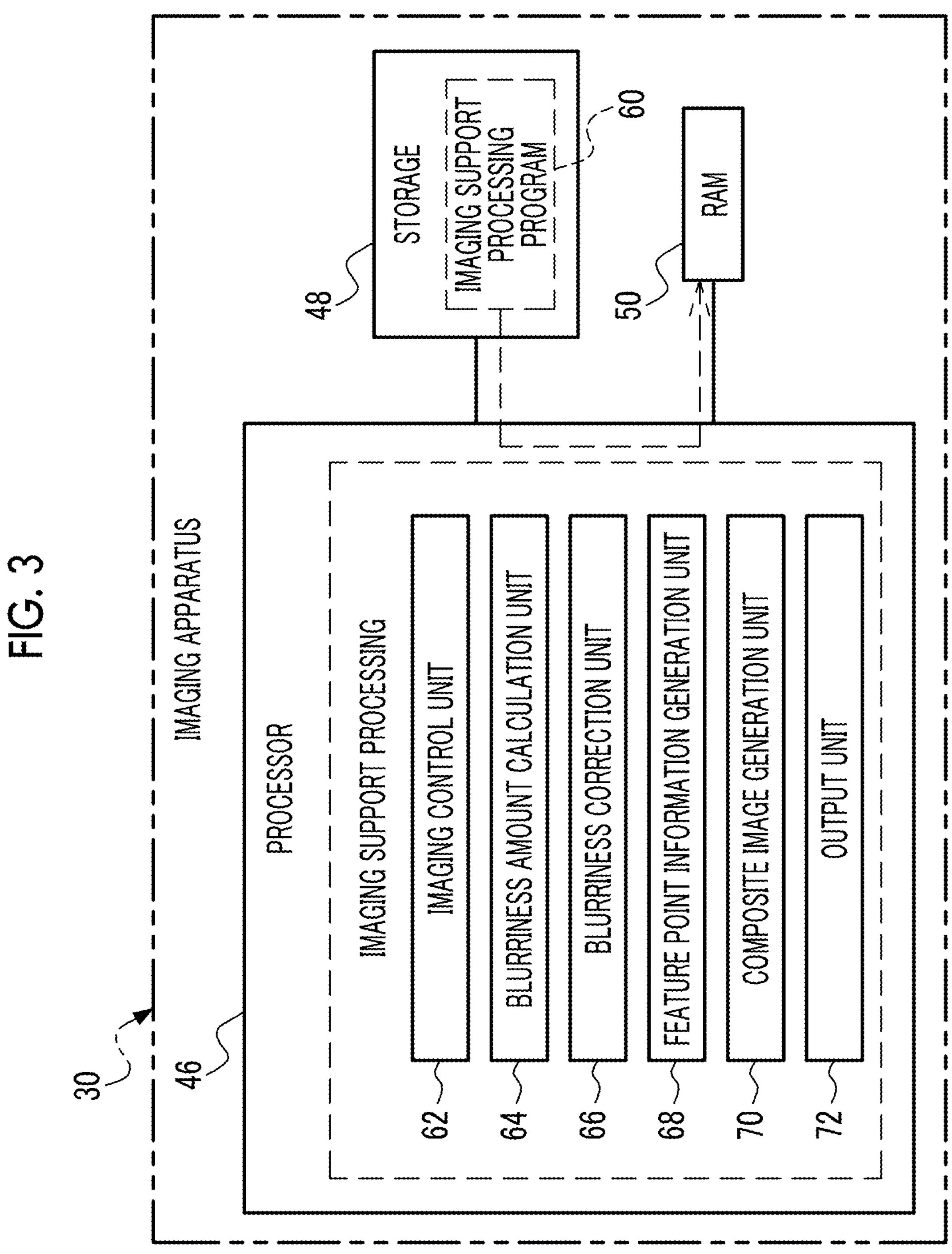
FIG. 3 is a block diagram illustrating an example of a functional configuration of the imaging apparatus.

Therefore, in view of such circumstances, for example, as illustrated in FIG. 3, the processor 46 performs imaging support processing in the present embodiment. An imaging support processing program 60 is stored in the storage 48. The imaging support processing program 60 is an example of the "program" according to the disclosed technology. The processor 46 reads out the imaging support processing program 60 from the storage 48 and executes the read imaging support processing program 60 on the RAM 50. The processor 46 performs the imaging support processing in accordance with the imaging support processing program 60 executed on the RAM 50.

The imaging support processing is implemented by causing the processor 46 to operate as an imaging control unit 62, a blurriness amount calculation unit 64, a blurriness correction unit 66, a feature point information generation unit 68, a composite image generation unit 70, and an output unit 72 in accordance with the imaging support processing program 60.

For example, as illustrated in FIG. 4, the flying object 10 receives the moving instruction signal transmitted from the transmitter 20 in accordance with an operation performed by the user and moves to an imaging position based on the received moving instruction signal. The flying object 10 also receives the standstill instruction signal transmitted from the transmitter 20 in accordance with an operation performed by the user and is brought to a standstill at the imaging position based on the received standstill instruction signal. In a case where the imaging apparatus 30 receives an imaging start signal transmitted from the transmitter 20 in accordance with an operation performed by the user, the imaging apparatus 30 executes imaging processing described below.

The imaging control unit 62 causes the laser light source 43 to perform irradiation with the laser light beam L by outputting an irradiation instruction signal 43A to the laser light source 43.

The imaging control unit 62 causes the image sensor 36 to image the imaging target divided region 3A by outputting a first imaging instruction signal 62A to the image sensor 36. The imaging target divided region 3A is irradiated with the laser light beam L. Accordingly, the imaging target divided region 3A in a state of being irradiated with the laser light beam L is imaged by the image sensor 36. Target image data 91 is obtained by imaging the imaging target divided region 3A via the image sensor 36 under control of the imaging control unit 62. The target image data 91 includes image data indicating the divided image 92. The target image data 91 is stored in the storage 48. For example, the divided image 92 indicated by the target image data 91 illustrated in FIG. 4 is the first combination image. The divided image 92 is an example of a "divided image" according to the disclosed technology. In the divided image 92, the overlapping region image 95A includes a laser light beam image 80 that is an image indicating the laser light beam L with which the imaging target divided region 3A is irradiated. In the example illustrated in FIG. 4, an example in which the laser light beam image 80 is a point image is illustrated. The laser light beam image 80 is an example of a "reference image" and an "image of the directional light beam" according to the disclosed technology.

The blurriness amount calculation unit 64 calculates the blurriness amount of the divided image 92 based on the laser light beam image 80 in the overlapping region image 95A of the divided image 92. The blurriness amount refers to a difference between an actual size of the laser light beam image 80 and a size of the laser light beam image 80 during focusing. For example, the laser light beam image 80 is specified by performing image analysis based on AI or on pattern matching. In the example illustrated in FIG. 4, the blurriness amount calculation unit 64 acquires the divided image 92 included in the target image data 91 stored in the storage 48. The blurriness amount calculation unit 64 also acquires reference light beam standard information 82 from the storage 48. The reference light beam standard information 82 is information indicating the size of the laser light beam image 80 during focusing. For example, the reference light beam standard information 82 is information indicating a table 82A including a numerical value indicating the imaging condition (for example, the subject distance) during focusing as an input value and including the size of the laser light beam image 80 as an output value. The blurriness amount calculation unit 64 derives the size of the laser light beam image 80 during focusing corresponding to the imaging condition of the divided image 92 from the table 82A indicated by the reference light beam standard information 82. The blurriness amount calculation unit 64 further calculates the blurriness amount by comparing the size of the laser light beam image 80 during focusing derived from the table 82A with the actual size of the laser light beam image 80 included in the divided image 92. The blurriness amount calculation unit 64 outputs first blurriness amount information 84 indicating the calculated blurriness amount to the storage 48.

For example, as illustrated in FIG. 5, in a case where the flying object 10 receives the moving instruction signal transmitted from the transmitter 20 in accordance with an operation performed by the user, the flying object 10 moves based on the received moving instruction signal. In the example illustrated in FIG. 5, the flying object 10 moves in the horizontal direction based on the moving instruction signal. Specifically, a moving direction of the flying object 10 is a rightward direction with respect to the wall surface 2A. The flying object 10 continues moving based on the received moving instruction signal while the flying object 10 is receiving the moving instruction signal transmitted from the transmitter 20 in accordance with an operation performed by the user.

The imaging control unit 62 causes the image sensor 36 to image the imaging target divided region 3A by outputting a second imaging instruction signal 62B to the image sensor 36. The target image data 91 is obtained by imaging the imaging target divided region 3A via the image sensor 36 under control of the imaging control unit 62. The target image data 91 includes image data indicating the divided image 94. The divided image 94 is obtained by performing imaging via the imaging apparatus 30 in a case where the flying object 10 has moved from the position at which the divided image 92 is obtained. The target image data 91 is stored in the storage 48. The divided image 94 is an example of the "divided image" according to the disclosed technology.

The blurriness amount calculation unit 64 calculates the blurriness amount of the divided image 94. The blurriness amount of the divided image 94 is calculated using the same method as the blurriness amount of the divided image 92. The blurriness amount calculation unit 64 outputs second blurriness amount information 86 indicating the calculated blurriness amount to the storage 48.

Figure 6:
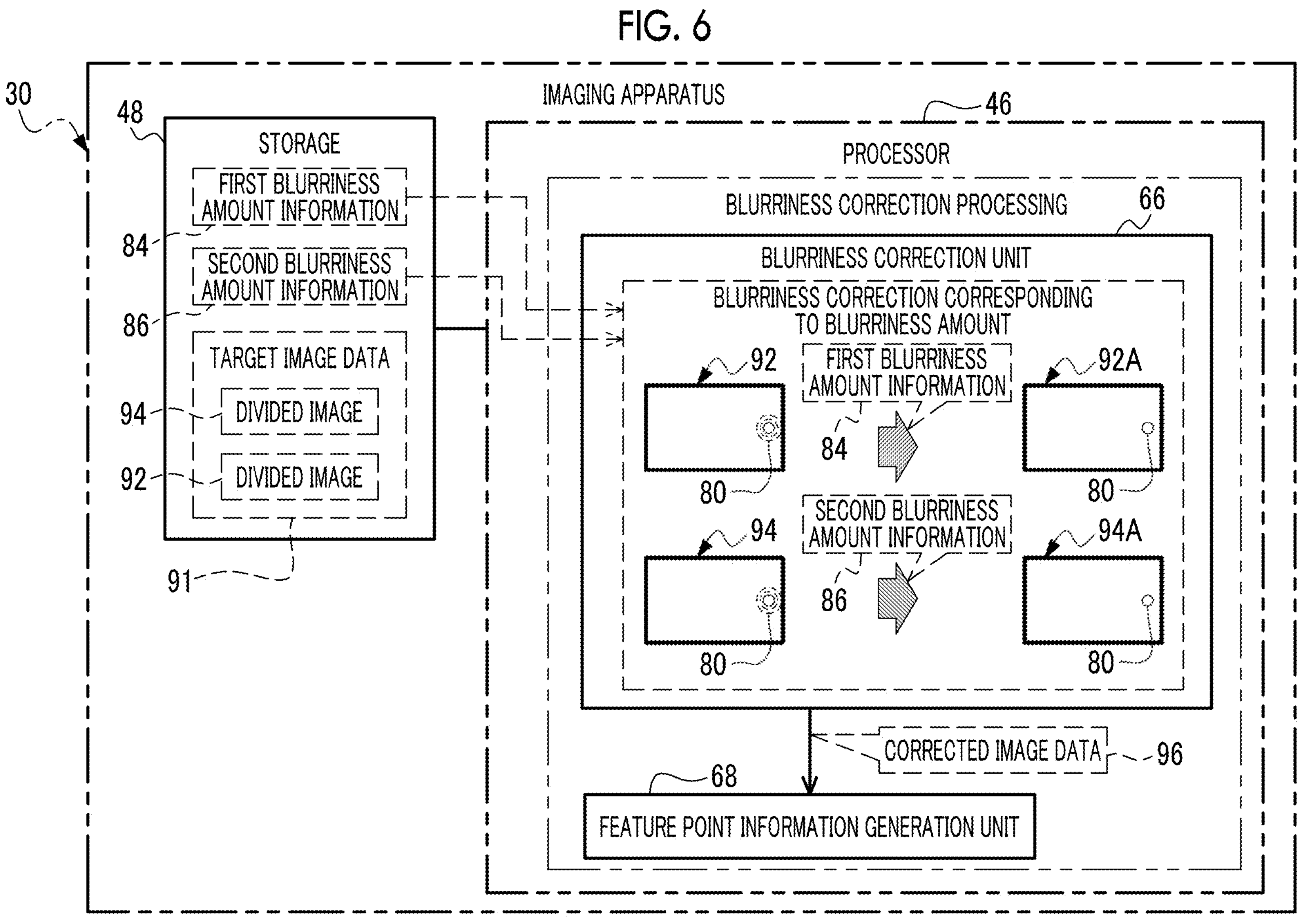
FIG. 6 is a descriptive diagram for describing an example of blurriness correction processing in the processor.

For example, as illustrated in FIG. 6, the blurriness correction unit 66 performs blurriness correction on the divided images 92 and 94 in accordance with the blurriness amounts obtained by the blurriness amount calculation unit 64. The blurriness correction unit 66 performs the blurriness correction for each of the divided images 92 and 94. Specifically, the blurriness correction unit 66 acquires the divided image 92 and the first blurriness amount information 84 from the storage 48. The blurriness correction unit 66 performs the blurriness correction on the divided image 92 in accordance with the blurriness amount indicated by the first blurriness amount information 84. The blurriness correction unit 66 also acquires the divided image 94 and the second blurriness amount information 86 from the storage 48. The blurriness correction unit 66 performs the blurriness correction on the divided image 94 in accordance with the blurriness amount indicated by the second blurriness amount information 86.

In blurriness correction processing in the blurriness correction unit 66, well-known blurriness correction processing in the related art is performed. For example, the blurriness correction unit 66 removes blurriness by performing filtering processing using a point spread function defining the laser light beam image 80, which is a point image, on the divided images 92 and 94. Removal of blurriness refers to not only complete removal of blurriness but also a removal of blurriness in a sense including reduction of blurriness that is generally allowed in the technical field of the disclosed technology and that does not contradict the gist of the disclosed technology.

As a result of the blurriness correction processing performed by the blurriness correction unit 66, a corrected image 92A that is an image obtained by correcting the blurriness of the divided image 92 and a corrected image 94A that is an image obtained by correcting the blurriness of the divided image 94 are obtained. The blurriness correction unit 66 outputs corrected image data 96 indicating the corrected images 92A and 94A to the feature point information generation unit 68 and the storage 48.

For example, as illustrated in FIG. 7, the feature point information generation unit 68 acquires the corrected images 92A and 94A included in the corrected image data 96 by acquiring the corrected image data 96 output from the blurriness correction unit 66 from the storage 48. The feature point information generation unit 68 generates first feature point information 92B based on the corrected image 92A. The first feature point information 92B is information indicating coordinates of a first feature point 92C included in the overlapping region image 95A of the corrected image 92A. For example, the feature point information generation unit 68 derives the first feature point 92C by performing image processing (for example, high-frequency component extraction processing) on the corrected image data 96. For example, the coordinates of the first feature point 92C are coordinates with reference to any one of four vertices of the imaging target divided region 3A. The first feature point 92C is an example of a "feature point" according to the disclosed technology.

The feature point information generation unit 68 generates second feature point information 94B based on the corrected image 94A. The second feature point information 94B is information indicating coordinates of a second feature point 94C included in the overlapping region image 95B of the corrected image 94A. The feature point information generation unit 68 derives the second feature point 94C using the same method as the first feature point 92C. The second feature point 94C is an example of the "feature point" according to the disclosed technology. The feature point information generation unit 68 outputs the first feature point information 92B and the second feature point information 94B to the composite image generation unit 70.

Figure 8:
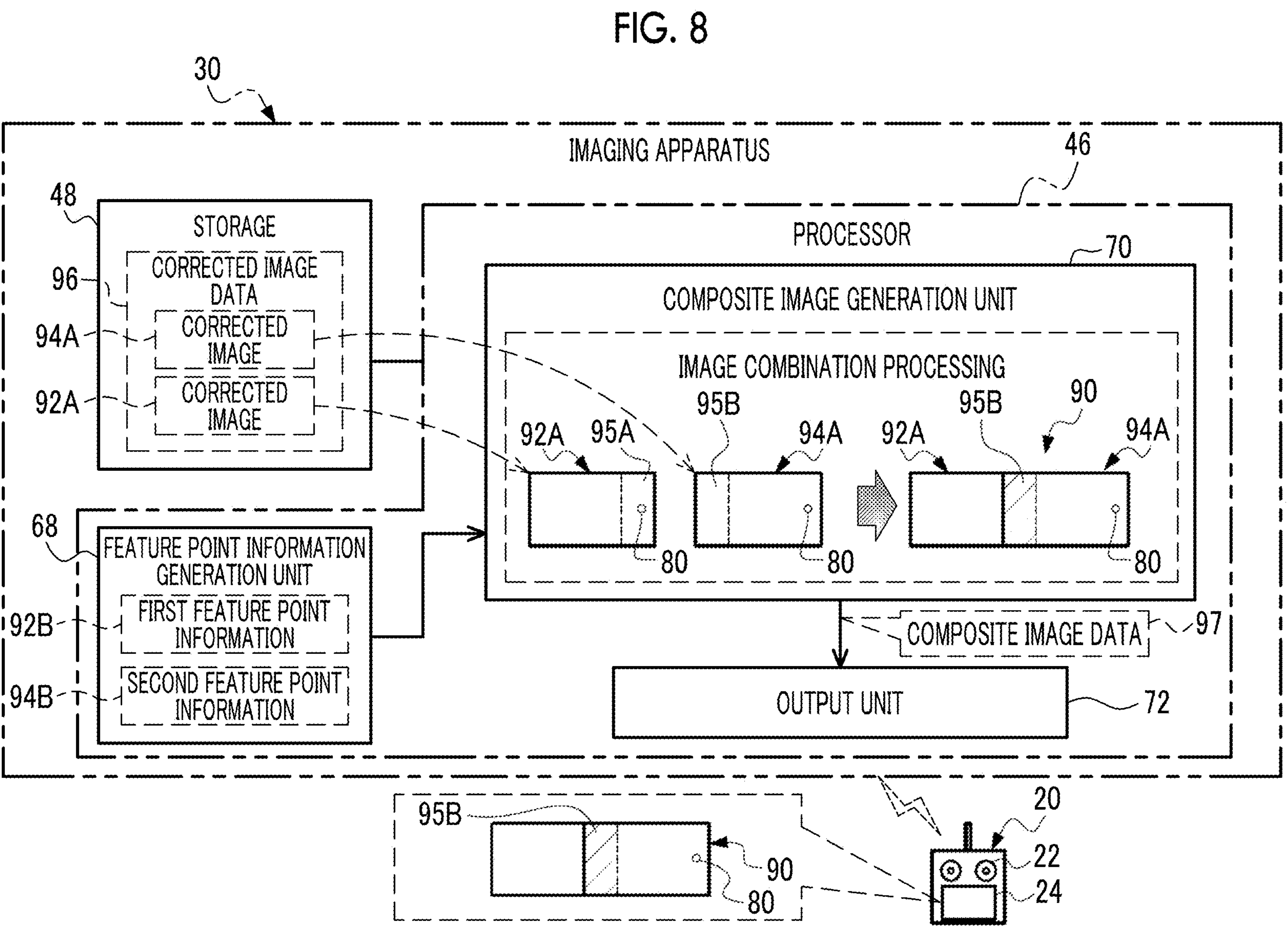
FIG. 8 is a descriptive diagram for describing an example of image combination processing in the processor.

For example, as illustrated in FIG. 8, the composite image generation unit 70 acquires the corrected images 92A and 94A from the storage 48. The composite image generation unit 70 also acquires the first feature point information 92B and the second feature point information 94B from the feature point information generation unit 68. The composite image generation unit 70 performs image combination processing on the corrected images 92A and 94A. The image combination processing is processing of generating the composite image 90 based on the first feature point information 92B and on the second feature point information 94B. The composite image generation unit 70 generates the composite image 90 by combining the overlapping region image 95A of the corrected image 92A and the overlapping region image 95B of the corrected image 94A in a state where the same feature points 92C and 94C overlap with each other to match.

The overlapping region image 95A of the corrected image 92A and the overlapping region image 95B of the corrected image 94A correspond to each other. That is, the overlapping region image 95A and the overlapping region image 95B indicate the common overlapping region 5. In a case where the corrected image 92A and the corrected image 94A are counted as a set, the laser light beam image 80 is included in the overlapping region image 95A of the corrected image 92A. Meanwhile, the overlapping region image 95B of the corrected image 94A does not include the laser light beam image 80. Therefore, the composite image generation unit 70 generates the composite image 90 using the overlapping region image 95B as an image indicating the overlapping region 5 in the composite image 90 in the image combination processing. Consequently, the composite image 90 includes the overlapping region image 95B that does not include the laser light beam image 80. In other words, the laser light beam image 80 is removed from the overlapping region image 95A of the composite image 90. The composite image generation unit 70 outputs composite image data 97 indicating the composite image 90 to the output unit 72.

The output unit 72 outputs the composite image data 97 to its outside. In the example illustrated in FIG. 8, the output unit 72 outputs the composite image data 97 to the transmitter 20. The transmitter 20 displays the composite image 90 indicated by the composite image data 97 on the display device 24.

Next, an action of the flying imaging apparatus 1 according to the present embodiment will be described with reference to FIG. 9. FIG. 9 illustrates an example of a flow of the imaging support processing according to the present embodiment. The flow of the imaging support processing illustrated in FIG. 9 is an example of the "imaging support method" according to the disclosed technology.

In the imaging support processing illustrated in FIG. 9, first, in step ST10, the imaging control unit 62 outputs the irradiation instruction signal 43A to the laser light source 43. Accordingly, the imaging target divided region 3A is irradiated with the laser light beam L from the laser light source 43 under control of the imaging control unit 62. After processing in step ST10 is executed, the imaging support processing transitions to step ST12.

In step ST12, the imaging control unit 62 outputs the first imaging instruction signal 62A to the image sensor 36. The imaging target divided region 3A is imaged by the image sensor 36 under control of the imaging control unit 62. After processing in step ST12 is executed, the imaging support processing transitions to step ST14.

In step ST14, the divided image 92 obtained by imaging the imaging target divided region 3A via the imaging apparatus 30 in step ST12 is acquired. After processing in step ST14 is executed, the imaging support processing transitions to step ST16.

In step ST16, the imaging control unit 62 determines whether divided images 92 of a number designated by the user are acquired. In step ST16, in a case where the number of divided images 92 has not reached the number designated by the user, a negative determination is made, and the imaging support processing transitions to step ST18. In step ST16, in a case where the number of divided images 92 has reached the number designated by the user, a positive determination is made, and the imaging support processing transitions to step ST20.

In step ST18, the flying object 10 moves to a next position based on the flying instruction signal transmitted from the transmitter 20. After processing in step ST18 is executed, the imaging support processing transitions to step ST12.

In step ST12, the imaging control unit 62 outputs the second imaging instruction signal 62B to the image sensor 36. The imaging target divided region 3A is imaged by the image sensor 36 under control of the imaging control unit 62. After processing in step ST12 is executed, the imaging support processing transitions to step ST14.

In step ST14, the divided image 94 obtained by imaging the imaging target divided region 3A via the imaging apparatus 30 in step ST12 is acquired. After processing in step ST14 is executed, the imaging support processing transitions to step ST16.

In step ST20, the blurriness amount calculation unit 64 acquires the target image data 91 indicating the divided images 92 and 94 obtained in step ST12. After processing in step ST20 is executed, the imaging support processing transitions to step ST22.

In step ST22, the blurriness amount calculation unit 64 calculates the blurriness amounts of the divided images 92 and 94 indicated by the target image data 91 acquired in step ST20. Specifically, the blurriness amount calculation unit 64 derives the size of the laser light beam image 80 during focusing corresponding to the imaging condition of the divided images 92 and 94 from the table 82A indicated by the reference light beam standard information 82. The blurriness amount calculation unit 64 further calculates the blurriness amounts by comparing the size of the laser light beam image 80 during focusing derived from the table 82A with the actual size of the laser light beam image 80 included in the divided images 92 and 94. After processing in step ST22 is executed, the imaging support processing transitions to step ST24.

In step ST24, the blurriness correction unit 66 performs the blurriness correction processing on the divided images 92 and 94 in accordance with the blurriness amounts calculated by the blurriness amount calculation unit 64 in step ST22. After processing in step ST24 is executed, the imaging support processing transitions to step ST26.

In step ST26, the feature point information generation unit 68 generates the first feature point information 92B and the second feature point information 94B based on the corrected images 92A and 94A subjected to the blurriness correction in step ST24. After processing in step ST26 is executed, the imaging support processing transitions to step ST28.

In step ST28, the composite image generation unit 70 generates the composite image 90 by combining the corrected images 92A and 94A based on the first feature point information 92B and the second feature point information 94B generated in step ST26. After processing in step ST28 is executed, the imaging support processing transitions to step ST30.

In step ST30, the output unit 72 outputs the composite image data 97 indicating the composite image 90 generated in step ST28 to its outside. After processing in step ST30 is executed, the imaging support processing is finished.

As described above, in the flying imaging apparatus 1 according to the present embodiment, for each of the plurality of divided regions 3 including the overlapping region 5, a part of the divided region 3 is irradiated with the laser light beam L, and the divided images 92 and 94 including the laser light beam image 80 indicating the laser light beam L are acquired for each divided region 3. Blurriness amounts of the overlapping region images 95A and 95B depend on a degree of spreading of the laser light beam image 80. Therefore, in the present configuration, the blurriness amount calculation unit 64 calculates the blurriness amounts of the overlapping region images 95A and 95B included in the divided images 92 and 94 based on the laser light beam image 80. Thus, according to the present configuration, the blurriness amounts of the overlapping region images 95A and 95B included in the divided images 92 and 94 can be accurately calculated. For example, in the present configuration, the blurriness amounts of the overlapping region images 95A and 95B included in the divided images 92 and 94 can be accurately calculated compared to that in a case where the blurriness amounts of the overlapping region images 95A and 95B of the divided images 92 and 94 are calculated based on the laser light beam L with which a region other than the overlapping region 5 in the divided region 3 is irradiated.

In the flying imaging apparatus 1 according to the present embodiment, the blurriness correction unit 66 individually performs the blurriness correction on each of the divided images 92 and 94 in accordance with the blurriness amounts calculated by the blurriness amount calculation unit 64. Since it is difficult to maintain the same imaging condition at all times because of disturbance (for example, an effect of wind) in the flying imaging apparatus 1, the blurriness amounts may vary between the divided images 92 and 94. Thus, the blurriness correction based on the blurriness amounts also needs to be performed for each of the divided images 92 and 94. Thus, according to the present configuration, the blurriness of the overlapping region images 95A and 95B included in the individual divided images 92 and 94 can be accurately corrected. For example, the blurriness of the overlapping region images 95A and 95B included in the individual divided images 92 and 94 can be accurately corrected compared to that in a case where the blurriness of one divided image 92 is corrected based on the blurriness amount of the other divided image 94.

In the flying imaging apparatus 1 according to the present embodiment, the composite image generation unit 70 generates the composite image 90 by combining the plurality of divided images 92 and 94 subjected to the blurriness correction. By performing the blurriness correction, the feature points included in the divided images 92 and 94 can be accurately extracted. Thus, according to the present configuration, the composite image 90 having very little misregistration can be generated. For example, the composite image 90 having little misregistration can be generated compared to that in a case where the plurality of divided images 92 and 94 are combined without performing the blurriness correction.

In the flying imaging apparatus 1 according to the present embodiment, the divided images 92 and 94 are combined based on the first feature points 92C and the second feature points 94C included in the overlapping region images 95A and 95B after the blurriness correction processing. The overlapping region images 95A and 95B not subjected to the blurriness correction have blurriness. Thus, it may be difficult to extract the first feature point 92C and the second feature point 94C. Thus, even in a case where the plurality of divided images 92 and 94 are combined using the overlapping region images 95A and 95B not subjected to the blurriness correction, the composite image 90 having little misregistration may not be obtained. In the present configuration, the composite image 90 is generated by combining the divided images 92 and 94 based on the first feature point 92C and the second feature point 94C included in the overlapping region images 95A and 95B subjected to the blurriness correction. Thus, according to the present configuration, the composite image 90 having very little misregistration can be generated. For example, the composite image 90 having little misregistration can be generated compared to that in a case where the divided images 92 and 94 are combined based on the first feature point 92C and the second feature point 94C of the overlapping region images 95A and 95B not subjected to the blurriness correction.

In the flying imaging apparatus 1 according to the present embodiment, in a case where the divided images 92 and 94 including the corresponding overlapping region images 95A and 95B are counted as a set, the laser light beam image 80 is included in the overlapping region image 95A in one of the set of divided images 92 and 94. The composite image 90 includes the overlapping region image 95B included in the divided image 94 in the set of divided images 92 and 94. That is, the divided images 92 and 94 are combined using the overlapping region image 95B that does not include the laser light beam image 80. Thus, according to the present configuration, the laser light beam image 80 is not captured in a part corresponding to the overlapping region 5 of the composite image 90.

In the flying imaging apparatus 1 according to the present embodiment, the laser light beam L is used as the reference light beam, and the laser light beam image 80 is used as the reference image included in the overlapping region images 95A and 95B. The laser light beam L that is a directional light beam has high directivity compared to a non-directional light beam. Thus, the blurriness amount calculation unit 64 easily specifies the degree of spreading of the laser light beam image 80. Thus, according to the present configuration, the blurriness amounts can be accurately calculated. For example, the reference image does not easily spread compared to that in a case where the reference light beam is a non-directional light beam, and the blurriness amounts can be accurately calculated.

In the flying imaging apparatus 1 according to the present embodiment, the blurriness amounts are calculated based on the size of the laser light beam image 80. The size of the laser light beam image 80 reflects spreading of the image caused by blurriness. Thus, according to the present configuration, the blurriness amounts can be accurately calculated. For example, the blurriness amounts can be accurately calculated compared to that in a case where the reference image is an image indicating a non-directional pattern and where the blurriness amounts are calculated from the pattern instead of a size of the reference image.

In the flying imaging apparatus 1 according to the present embodiment, the position determined in advance in the overlapping region 5 is irradiated with the laser light beam L. Accordingly, since a position of the laser light beam image 80 in the divided images 92 and 94 is determined in advance, the laser light beam image 80 is accurately specified. The blurriness amounts are calculated based on the laser light beam image 80. Thus, according to the present configuration, since the laser light beam image 80 is accurately specified, the blurriness amounts can be accurately calculated. For example, the laser light beam image 80 is accurately specified compared to that in a case where different positions for each divided image are irradiated with the reference light beam. Thus, the blurriness amounts can be accurately calculated. In addition, for example, since the position of the laser light beam image 80 is determined in advance compared to that in a case where different positions for each divided image are irradiated with the reference light beam, the blurriness amounts can be easily calculated.

In the flying imaging apparatus 1 according to the present embodiment, the plurality of divided regions 3 are determined in advance by the angle of view of the imaging apparatus 30. Accordingly, sizes of the divided images 92 and 94 are constant. Thus, according to the present configuration, since the sizes of the divided images 92 and 94 are constant, processing of combining the divided images 92 and 94 is easily performed.

In the present embodiment, for example, processing such as interpolation processing using pixel values of surrounding pixels that makes the laser light beam image 80 captured in the corrected image 94A noticeable may be performed.

In the present embodiment, in a case where the blurriness amounts calculated by the blurriness amount calculation unit 64 is less than a threshold value set in advance, the blurriness correction unit 66 may not perform the blurriness correction. A blurriness amount with which it is difficult to extract the feature point 92C or 94C via the feature point information generation unit 68 is set as the threshold value. For example, the blurriness amount with which it is difficult to extract the feature point 92C or 94C is a blurriness amount with which a sufficient quantity of feature points 92C or 94C for generating the composite image 90 are not extracted with a probability of 50% or higher. By doing so, unnecessary blurriness correction can be avoided.

First Modification Example

While an example of an aspect of extracting the first feature point 92C included in the entire overlapping region image 95A in the corrected image 92A has been illustratively described in the first embodiment, the disclosed technology is not limited to this. In a first modification example, the first feature point 92C included in a region 95C other than the laser light beam image 80 in the overlapping region image 95A is extracted.

For example, as illustrated in FIG. 10, the feature point information generation unit 68 acquires the corrected image 92A by acquiring the corrected image data 96 stored in the storage 48. The feature point information generation unit 68 generates the first feature point information 92B based on the corrected image 92A. The first feature point information 92B is information indicating the coordinates of the first feature point 92C included in the corrected image 92A.

The feature point information generation unit 68 extracts the first feature point 92C included in the region 95C other than the laser light beam image 80 in the overlapping region image 95A in the corrected image 92A. In other words, the feature point information generation unit 68 specifies the laser light beam image 80 in the overlapping region image 95A and extracts the first feature point 92C from the remaining region 95C excluding the laser light beam image 80. For example, the laser light beam image 80 in the corrected image 92A is specified by performing image analysis based on AI or pattern matching. The region 95C is an example of a "region other than the reference image" according to the disclosed technology.

As described above, in the flying imaging apparatus 1 according to the first modification example, the first feature point 92C is included in the region 95C other than the laser light beam image 80 in the overlapping region image 95A. The overlapping region image 95A of the divided image 92 includes the laser light beam image 80, and the overlapping region image 95B of the divided image 94 does not include the laser light beam image 80. Thus, it is difficult to extract feature points having a correspondence relationship from a region corresponding to the position of the laser light beam image 80 between the divided image 92 and the divided image 94. The reason for this is that a part irradiated with the laser light beam image 80 in the overlapping region image 95A and a part not irradiated with the laser light beam image 80 in the overlapping region image 95B are differently captured.

In the present configuration, the divided image 92 is combined based on the first feature point 92C included in the region 95C other than the laser light beam image 80 in the overlapping region image 95A. The first feature point 92C can be more accurately extracted from the region 95C other than the laser light beam image 80 in the overlapping region image 95A of the divided image 92 than from the region corresponding to the position of the laser light beam image 80. In a case where the first feature point 92C is accurately extracted, accuracy of combining the divided image 92 using the first feature point 92C is also improved. Thus, according to the present configuration, the composite image 90 having further less misregistration can be generated. For example, the composite image 90 having little misregistration can be generated compared to that in a case where the first feature point 92C is extracted including a region of the laser light beam image 80.

Second Embodiment

While an example of an aspect of generating the composite image 90 after the blurriness correction has been illustratively described in the first embodiment, the disclosed technology is not limited to this. Since the blurriness correction requires a corresponding amount of processing time, display of the composite image 90 requires time in a case where the composite image 90 is generated after the blurriness correction. Therefore, in a second embodiment, the blurriness correction is performed after the composite image 90 is generated.

In the following description, it is assumed that the blurriness amount calculation unit 64 has already finished calculating the blurriness amounts and that the calculated blurriness amounts fall within a threshold value range set in advance. In this case, a blurriness amount range in which extraction of the feature point 92C or 94C by the feature point information generation unit 68 is not affected but the blurriness correction is needed in order to improve image quality of the composite image 90 is set as the threshold value range.

For example, as illustrated in FIG. 11, the feature point information generation unit 68 acquires the divided images 92 and 94 included in the target image data 91 stored in the storage 48. The feature point information generation unit 68 extracts the first feature point 92C included in the overlapping region image 95A in the divided image 92. The feature point information generation unit 68 generates the first feature point information 92B indicating the coordinates of the extracted first feature point 92C.

The feature point information generation unit 68 extracts the second feature point 94C included in the overlapping region image 95B in the divided image 94. The feature point information generation unit 68 generates the second feature point information 94B indicating the coordinates of the extracted second feature point 94C. The feature point information generation unit 68 outputs the first feature point information 92B and the second feature point information 94B to the composite image generation unit 70.

For example, as illustrated in FIG. 12, the composite image generation unit 70 acquires the divided images 92 and 94 from the storage 48. The composite image generation unit 70 also acquires the first feature point information 92B and the second feature point information 94B from the feature point information generation unit 68. The composite image generation unit 70 performs the image combination processing on the divided images 92 and 94. The image combination processing is processing of generating the composite image 90 based on the first feature point information 92B and on the second feature point information 94B. The composite image generation unit 70 generates the composite image 90 by combining the overlapping region image 95A of the divided image 92 and the overlapping region image 95B of the divided image 94 in a state where the same feature points 92C and 94C overlap with each other to match. The composite image generation unit 70 outputs the composite image data 97 indicating the composite image 90 to the blurriness correction unit 66 and the output unit 72. The output unit 72 transmits the composite image data 97 to the transmitter 20, and the composite image 90 is displayed on the display device 24.

For example, as illustrated in FIG. 13, the blurriness correction unit 66 performs the blurriness correction on the composite image 90 in accordance with the blurriness amounts obtained by the blurriness amount calculation unit 64 (FIGS. 4 and 5). Specifically, the blurriness correction unit 66 acquires the composite image 90 and the first blurriness amount information 84 from the storage 48. The blurriness correction unit 66 performs the blurriness correction on a region corresponding to the divided image 92 in the composite image 90 in accordance with the blurriness amount indicated by the first blurriness amount information 84. The blurriness correction unit 66 also acquires the second blurriness amount information 86 from the storage 48. The blurriness correction unit 66 performs the blurriness correction on a region corresponding to the divided image 94 in the composite image 90 in accordance with the blurriness amount indicated by the second blurriness amount information 86. The region on which the blurriness correction corresponding to the blurriness amount indicated by the second blurriness amount information 86 is performed includes a region corresponding to the overlapping region image 95B. The blurriness correction unit 66 outputs the corrected image data 96 indicating a corrected composite image 90C that is an image obtained by correcting blurriness of the composite image 90, to the output unit 72. The output unit 72 transmits the corrected image data 96 to the transmitter 20, and the corrected composite image 90C is displayed on the display device 24 instead of the composite image 90.

As described above, in the flying imaging apparatus 1 according to the second embodiment, the composite image 90 is generated by combining the plurality of divided images 92 and 94 obtained for the plurality of divided regions 3, and the blurriness correction is performed on the composite image 90 using the blurriness amounts obtained for each of the regions corresponding to the divided images 92 and 94. By generating the composite image 90 by postponing the blurriness correction that requires processing time, the composite image 90 can be provided to the user without requiring time.

Second Modification Example

While an example of an aspect in which the composite image 90 is the two-dimensional image 90A has been illustratively described in each embodiment, the disclosed technology is not limited to this. In a second modification example, the composite image 90 is a three-dimensional image 90B.

Figure 14:
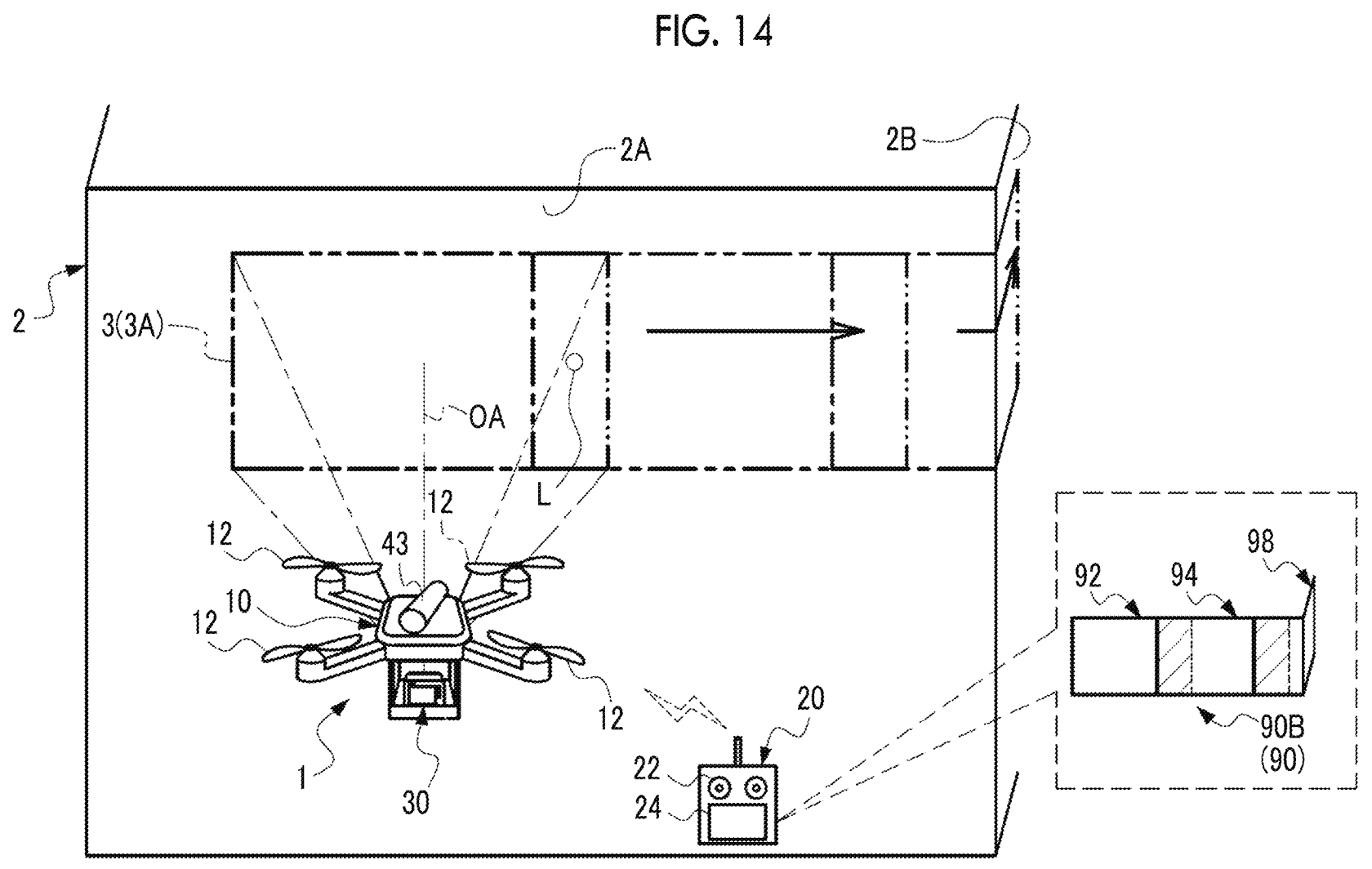

For example, as illustrated in FIG. 14, the flying imaging apparatus 1 images the plurality of divided regions 3 of the wall surface 2A in order. The flying imaging apparatus 1 also images a plurality of divided regions 3 on a wall surface 2B that is contiguous with the wall surface 2A. The plurality of divided regions 3 are irradiated with the laser light beam L. A plurality of divided images 92, 94, and 98 are obtained by imaging the plurality of divided regions 3 in order via the imaging apparatus 30. The composite image 90 is generated by combining the plurality of divided images 92, 94, and 98. The composite image 90 is the three-dimensional image 90B that is a three-dimensional image indicating the imaging target 2.

In generating the composite image 90, the blurriness amount calculation unit 64 (refer to FIGS. 4 and 5) calculates the blurriness amounts for the divided images 92, 94, and 98. The blurriness correction unit 66 (refer to FIG. 6) performs the blurriness correction processing for each of the divided images 92, 94, and 98. Accordingly, blurriness of the divided images 92, 94, and 98 is corrected. The composite image generation unit 70 (refer to FIG. 8) performs the image combination processing on the divided images 92, 94, and 98 based on feature point information generated by the feature point information generation unit 68 (refer to FIG. 6). Consequently, the composite image 90 is generated.

Third Modification Example

Figure 15:
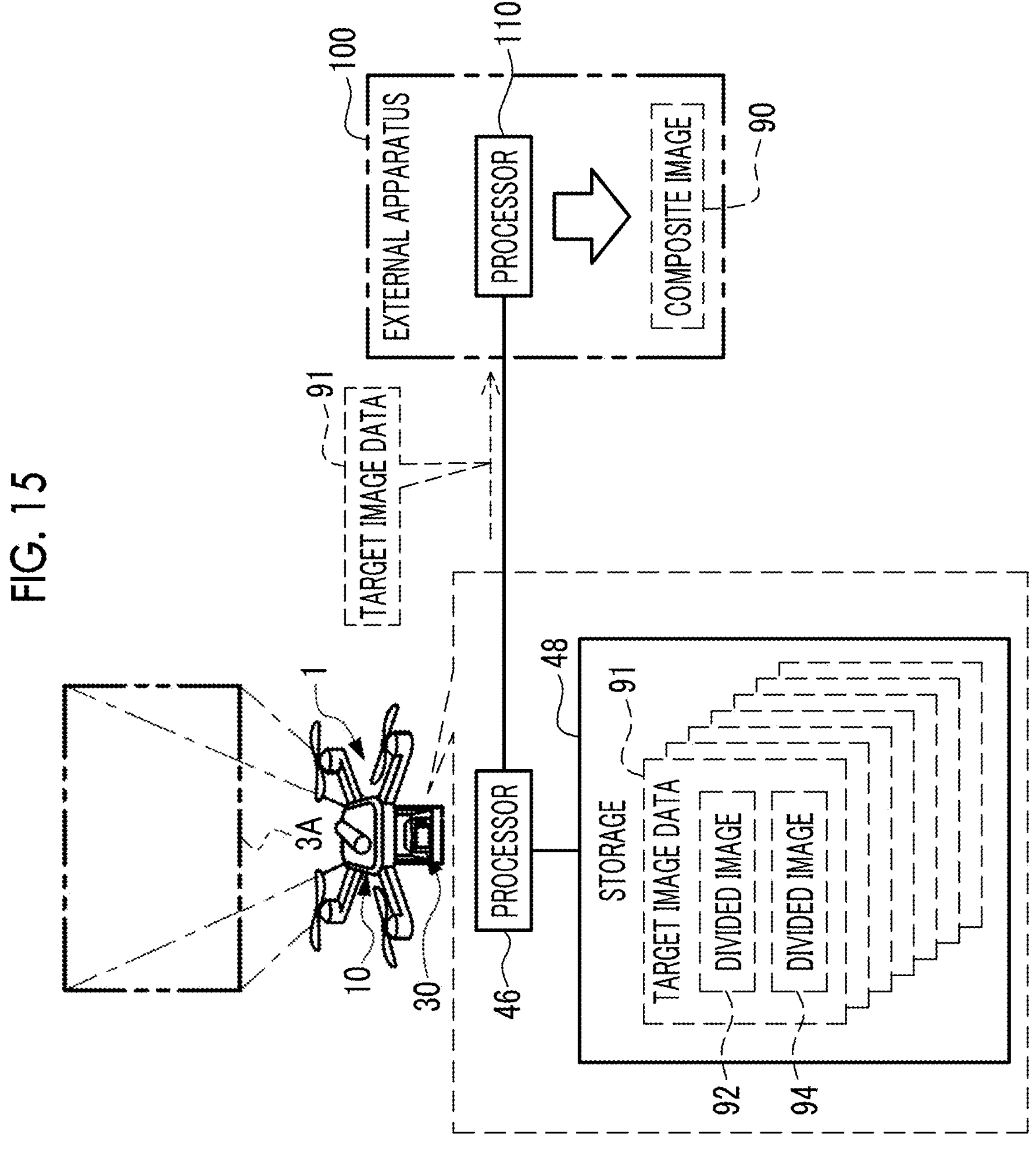
FIG. 15 is a descriptive diagram for describing an example of the image combination processing according to a third modification example.

While an example of an aspect in which the processor 46 of the flying imaging apparatus 1 generates the composite image 90 based on the target image data 91 stored in the storage 48 has been illustratively described in each embodiment, the disclosed technology is not limited to this. For example, as illustrated in FIG. 15, a plurality of pieces of target image data 91 may be input into a processor 110 of an external apparatus 100 communicably connected to the flying imaging apparatus 1 through wired connection or wireless connection from the processor 46 of the flying imaging apparatus 1. The processor 110 of the external apparatus 100 may generate the composite image 90 based on the plurality of pieces of target image data 91. The external apparatus 100 is an example of the "imaging support apparatus" according to the disclosed technology, and the processor 110 is an example of the "processor" according to the disclosed technology.

In this case, processing such as capturing of the divided image 92 and the like and generation of the composite image 90 can be appropriately divided such that only capturing of the divided image 92 and the like is performed on a site on which the imaging target 2 such as a bridge is present and that the composite image 90 is generated after returning to a base such as a construction office or the like in which the external apparatus 100 is installed.

In the first embodiment, the composite image 90 may be generated by performing the blurriness correction on only the overlapping region images 95A and 95B, and then the blurriness correction may be performed on a region of the composite image 90 other than the overlapping region image 95B. Generation of the composite image 90 by performing the blurriness correction on only the overlapping region images 95A and 95B may be performed on the site, and the blurriness correction for the region of the composite image 90 other than the overlapping region image 95B may be performed by the external apparatus 100 after returning to the base.

While an example of an aspect of performing imaging in a state where the optical axis OA is perpendicular has been illustratively described in each embodiment, the disclosed technology is not limited to this. For example, the plurality of divided images 92 and 94 used for generating the composite image 90 may include an image subjected to projective transformation. For example, the image subjected to the projective transformation refers to an image obtained by correcting an image including an image region that is distorted into a trapezoid or the like because of a posture (for example, a depression angle or an elevation angle) of the imaging apparatus 30. The projective transformation is processing performed on an image obtained by imaging the wall surface 2A via the imaging apparatus 30 in a state where the posture of the imaging apparatus 30 is inclined with respect to the wall surface 2A (that is, a state where the optical axis OA of the imaging apparatus 30 is inclined with respect to the wall surface 2A).

Distortion of the image caused by the depression angle or the elevation angle is corrected by performing the projective transformation. That is, by performing the projective transformation, the image obtained by performing imaging via the imaging apparatus 30 in a state where the posture of the imaging apparatus 30 is inclined with respect to the wall surface 2A is transformed into an image that seems to be obtained by performing imaging from a position normal to the wall surface 2A (that is, in a state where the optical axis OA is perpendicular).

While an example of an aspect of irradiating the divided region 3 with the laser light beam L as the reference light beam to include the laser light beam image 80 in the divided image 92 as the reference image has been illustratively described in each embodiment, the disclosed technology is not limited to this. Instead of the laser light beam L, the divided region 3 may be irradiated with a directional light beam with which an LED light source, an SLD light source, or the like performs irradiation to include an image of the directional light beam in the divided images 92 and 94.

While an example of an aspect in which the laser light beam image 80 is a point image as the reference light beam has been illustratively described in each embodiment, the disclosed technology is not limited to this. The laser light beam image 80 may be a rectangular or triangular image or pattern other than a point image.

While an example of an aspect in which the flying imaging apparatus 1 flies and performs imaging based on the flying instruction signal and the imaging start signal from the transmitter 20 has been illustratively described in each embodiment, the disclosed technology is not limited to this. For example, the flying imaging apparatus 1 may fly and perform imaging in accordance with a flight plan determined in advance.

While an example of mounting the imaging apparatus 30 on the flying object 10 is illustrated in each embodiment, the imaging apparatus 30 may be mounted on various moving objects (for example, a gondola, an automatic transport robot, an unmanned transport vehicle, or an aerial inspection vehicle) and the like. The moving object may be a person. For example, the person refers to a worker who performs survey and/or inspection of land and/or infrastructure or the like. In a case where the moving object is a person, mounting the imaging apparatus 30 includes an aspect of causing a person to hold the imaging apparatus 30 (for example, a portable terminal having a camera function) and/or attaching the imaging apparatus 30 to equipment (for example, a helmet or workwear) worn by a person.

While the processor 46 is illustrated in each embodiment, at least another CPU, at least one GPU, and/or at least one TPU may be used instead of the processor 46 or together with the processor 46.

While an example of an aspect of storing the imaging support processing program 60 in the storage 48 has been illustratively described in each embodiment, the disclosed technology is not limited to this. For example, the imaging support processing program 60 may be stored in a portable non-transitory computer-readable storage medium (hereinafter, simply referred to as a "non-transitory storage medium") such as an SSD or a USB memory. The imaging support processing program 60 stored in the non-transitory storage medium is installed on the computer 32 of the imaging apparatus 30, and the processor 46 executes processing in accordance with the imaging support processing program 60.

The imaging support processing program 60 may also be stored in a storage device of another computer, a server apparatus, or the like connected to the imaging apparatus 30 through a network, and the imaging support processing program 60 may be downloaded in accordance with a request of the imaging apparatus 30 and installed on the computer 32.

The storage device of another computer, a server apparatus, or the like connected to the imaging apparatus 30 or the storage 48 does not need to store the entire imaging support processing program 60 and may store a part of the imaging support processing program 60.

While the computer 32 is incorporated in the imaging apparatus 30, the disclosed technology is not limited to this. For example, the computer 32 may be provided outside the imaging apparatus 30.

While the computer 32 including the processor 46, the storage 48, and the RAM 50 is illustrated in each embodiment, the disclosed technology is not limited to this, and a device including an ASIC, an FPGA, and/or a PLD may be applied instead of the computer 32. A combination of a hardware configuration and a software configuration may also be used instead of the computer 32.

The following various processors can be used as a hardware resource for executing various types of processing described in each embodiment. Examples of the processors include a CPU that is a general-purpose processor functioning as the hardware resource for executing the various types of processing by executing software, that is, a program. Examples of the processors also include a dedicated electronic circuit such as an FPGA, a PLD, or an ASIC that is a processor having a circuit configuration dedicatedly designed to execute specific processing. Any of the processors incorporates or is connected to a memory, and any of the processors executes the various types of processing using the memory.

The hardware resource for executing the various types of processing may be composed of one of the various processors or may be composed of a combination of two or more processors of the same type or different types (for example, a combination of a plurality of FPGAs or a combination of a CPU and an FPGA). The hardware resource for executing the various types of processing may also be one processor.

Examples of the hardware resource composed of one processor include, first, an aspect of one processor composed of a combination of one or more CPUs and software, in which the processor functions as the hardware resource for executing the various types of processing. Second, as represented by an SoC or the like, an aspect of using a processor that implements functions of the entire system including a plurality of hardware resources for executing the various types of processing in one IC chip is included. Accordingly, the various types of processing are implemented using one or more of the various processors as the hardware resource.

More specifically, an electronic circuit in which circuit elements such as semiconductor elements are combined can be used as a hardware structure of the various processors. The processing described above is merely an example. Accordingly, it is possible to delete unnecessary steps, add new steps, or rearrange a processing order without departing from the gist of the disclosed technology.

Above described content and illustrated content are detailed description for parts according to the disclosed technology and are merely an example of the disclosed technology. For example, description related to the above configurations, functions, actions, and effects is description related to examples of configurations, functions, actions, and effects of the parts according to the disclosed technology. Thus, it is possible to remove unnecessary parts, add new elements, or replace parts in the above described content and the illustrated content without departing from the gist of the disclosed technology. Particularly, description related to common technical knowledge or the like that is not required to be described for embodying the disclosed technology is omitted in the above described content and the illustrated content in order to avoid complication and facilitate understanding of the parts according to the disclosed technology.

In the present specification, "A and/or B" is synonymous with "at least one of A or B". That is, "A and/or B" may mean only A, only B, or a combination of A and B. In the present specification, the same approach as "A and/or B" also applies to an expression of three or more matters connected with "and/or".

All documents, patent applications, and technical standards disclosed in the present specification are incorporated in the present specification by reference to the same extent as those in a case where each of the documents, patent applications, and technical standards are specifically and individually indicated to be incorporated by reference.

The disclosure of JP2022-062894 filed on Apr. 5, 2022 is incorporated in the present specification by reference in its entirety.

The following appendices are further disclosed with respect to the above embodiments.

Appendix 1

An imaging support apparatus comprising a processor, in which the processor is configured to, for each of a plurality of divided regions that are obtained by dividing an imaging target region and that have an overlapping region which is a region in which the divided regions partially overlap with each other, cause a light source to irradiate the overlapping region of the divided region with a reference light beam, acquire a divided image including a reference image indicating the reference light beam for each divided region by causing an imaging apparatus to image the divided region in a state where the overlapping region is irradiated with the reference light beam, and calculate a blurriness amount of an overlapping region image indicating the overlapping region for each divided region based on the reference image in the divided image.

Appendix 2

The imaging support apparatus according to Appendix 1, in which the processor is configured to individually perform blurriness correction on each of a plurality of the divided images in accordance with the blurriness amount.

Appendix 3

The imaging support apparatus according to Appendix 2, in which the processor is configured to generate a composite image by combining the plurality of divided images subjected to the blurriness correction.

Appendix 4

The imaging support apparatus according to Appendix 3, in which the processor is configured to combine the plurality of divided images based on a feature point included in the overlapping region image after the blurriness correction.

Appendix 5

The imaging support apparatus according to Appendix 4, in which the feature point is included in a region other than the reference image in the overlapping region image.

Appendix 6

The imaging support apparatus according to Appendix 1, in which the processor is configured to generate a composite image by combining a plurality of the divided images obtained for the plurality of divided regions, and perform blurriness correction on the composite image using the blurriness amount obtained for each divided region.

Appendix 7

The imaging support apparatus according to Appendix 3, in which in a case where the plurality of divided images including a corresponding overlapping region image are counted as a set, the reference image is included in the overlapping region image in one of the set of divided images, and the composite image includes the overlapping region image included in the other of the set of divided images.

Appendix 8

The imaging support apparatus according to any one of Appendices 1 to 7, in which the reference light beam is a directional light beam, and the reference image is an image of the directional light beam.

Appendix 9

The imaging support apparatus according to any one of Appendices 1 to 8, in which the blurriness amount is calculated based on a size of the reference image.

Appendix 10

The imaging support apparatus according to any one of Appendices 1 to 9, in which a position determined in advance in the overlapping region image is irradiated with the reference light beam.

Appendix 11

The imaging support apparatus according to any one of Appendices 1 to 10, in which each of the plurality of divided regions is determined in advance by an angle of view of the imaging apparatus.

Appendix 12

A moving object comprising the imaging support apparatus according to any one of Appendices 1 to 11.

What is claimed is:

1. An imaging support apparatus comprising:

a processor, wherein the processor is configured to:

for each of a plurality of divided regions that are obtained by dividing an imaging target region and that have an overlapping region which is a region in which the divided regions partially overlap with each other, cause a light source to irradiate the overlapping region of the divided region with a reference light beam;

acquire a divided image including a reference image indicating the reference light beam for each divided region by causing an imaging apparatus to image the divided region in a state where the overlapping region is irradiated with the reference light beam; and calculate a blurriness amount of an overlapping region image indicating the overlapping region for each divided region based on the reference image in the divided image.

2. The imaging support apparatus according to claim 1, wherein the processor is configured to individually perform blurriness correction on each of a plurality of the divided images in accordance with the blurriness amount.

3. The imaging support apparatus according to claim 2, wherein the processor is configured to generate a composite image by combining the plurality of divided images subjected to the blurriness correction.

4. The imaging support apparatus according to claim 3, wherein the processor is configured to combine the plurality of divided images based on a feature point included in the overlapping region image after the blurriness correction.

5. The imaging support apparatus according to claim 4, wherein the feature point is included in a region other than the reference image in the overlapping region image.

6. The imaging support apparatus according to claim 3, wherein in a case where the plurality of divided images including a corresponding overlapping region image are counted as a set, the reference image is included in the overlapping region image in one of the set of divided images, and the composite image includes the overlapping region image included in the other of the set of divided images.

7. The imaging support apparatus according to claim 1, wherein the processor is configured to:

generate a composite image by combining a plurality of the divided images obtained for the plurality of divided regions; and perform blurriness correction on the composite image using the blurriness amount obtained for each divided region.

8. The imaging support apparatus according to claim 1, wherein the reference light beam is a directional light beam, and the reference image is an image of the directional light beam.

9. The imaging support apparatus according to claim 1, wherein the blurriness amount is calculated based on a size of the reference image.

10. The imaging support apparatus according to claim 1, wherein a position determined in advance in the overlapping region image is irradiated with the reference light beam.

11. The imaging support apparatus according to claim 1, wherein each of the plurality of divided regions is determined in advance by an angle of view of the imaging apparatus.

12. A moving object comprising:

the imaging support apparatus according to claim 1.

13. An imaging support method comprising:

by a processor, causing, for each of a plurality of divided regions that are obtained by dividing an imaging target region and that have an overlapping region which is a region in which the divided regions partially overlap with each other, a light source to irradiate the overlapping region of the divided region with a reference light beam;

by a processor, acquiring a divided image including a reference image indicating the reference light beam for each divided region by causing an imaging apparatus to image the divided region in a state where the overlapping region is irradiated with the reference light beam; and by a processor, calculating a blurriness amount of an overlapping region image indicating the overlapping region for each divided region based on the reference image in the divided image.

14. A non-transitory computer-readable storage medium storing a program executable by a computer to execute a process comprising:

causing, for each of a plurality of divided regions that are obtained by dividing an imaging target region and that have an overlapping region which is a region in which the divided regions partially overlap with each other, a light source to irradiate the overlapping region of the divided region with a reference light beam;

acquiring a divided image including a reference image indicating the reference light beam for each divided region by causing an imaging apparatus to image the divided region in a state where the overlapping region is irradiated with the reference light beam; and calculating a blurriness amount of an overlapping region image indicating the overlapping region for each divided region based on the reference image in the divided image.

* * * * *